US012787069B2

(12) United States Patent
Wen

(10) Patent No.: US 12,787,069 B2
(45) Date of Patent: Nov. 3, 2026

(54) INFORMATION REPORTING METHOD, TERMINAL, AND NETWORK SIDE DEVICE

(71) Applicant: VIVO MOBILE COMMUNICATION CO., LTD., Dongguan (CN)

(72) Inventor: Ming Wen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 361 days.

(21) Appl. No.: 18/432,181

(22) Filed: Feb. 5, 2024

(65) Prior Publication Data

US 2024/0179757 A1 May 30, 2024

Related U.S. Application Data

(63) Continuation of application No. PCT/CN2022/110307, filed on Aug. 4, 2022.

(30) Foreign Application Priority Data

Aug. 6, 2021 (CN) ........................ 202110904076.7

(51) Int. Cl.

| | |
|---|---|
| ***H04W 74/0836*** | (2024.01) |
| ***H04B 17/318*** | (2015.01) |
| ***H04W 76/19*** | (2018.01) |
| ***H04W 76/20*** | (2018.01) |
| ***H04W 76/30*** | (2018.01) |

(52) U.S. Cl.

CPC ...... *H04W 74/0836* (2024.01); *H04B 17/328* (2023.05); *H04W 76/19* (2018.02); *H04W 76/20* (2018.02); *H04W 76/30* (2018.02)

(58) Field of Classification Search

CPC ......... H04W 74/0836; H04W 74/0833; H04W 76/19; H04W 76/20; H04W 76/18; H04W 76/30; H04W 76/27; H04W 76/32; H04B 17/328

See application file for complete search history.

(56) References Cited

U.S. PATENT DOCUMENTS

| | | | | |
|---|---|---|---|---|
| 12,593,359 | B2 * | 3/2026 | Jiang | H04W 74/04 |
| 2021/0105851 | A1 | 4/2021 | Kim | |
| 2021/0136831 | A1 | 5/2021 | Zhang et al. | |
| 2021/0195654 | A1 * | 6/2021 | Lei | H04W 74/0833 |

(Continued)

FOREIGN PATENT DOCUMENTS

| | | | |
|---|---|---|---|
| CN | 110557763 | A | 12/2019 |
| CN | 110662251 | A | 1/2020 |

(Continued)

OTHER PUBLICATIONS

International Search Report and Written Opinion of the International Searching Authority regarding International Patent Application No. PCT/CN2022/110307, dated Oct. 27, 2022. Translation provided by Bohui Intellectual Property.

(Continued)

*Primary Examiner* — Bailor C Hsu
(74) *Attorney, Agent, or Firm* — Harness, Dickey & Pierce, P.L.C.

(57) ABSTRACT

An information reporting method, includes: reporting, by a terminal, first information to a network side device, where the first information is information when the terminal executes a random access small data transmission RA SDT procedure.

20 Claims, 5 Drawing Sheets

300

(56) References Cited

U.S. PATENT DOCUMENTS

| | | | |
|---|---|---|---|
| 2021/0227586 A1 | 7/2021 | Huang et al. | |
| 2021/0274525 A1* | 9/2021 | Wei | H04W 76/27 |
| 2022/0022266 A1* | 1/2022 | Agiwal | H04W 74/0841 |
| 2022/0078697 A1* | 3/2022 | Tseng | H04W 48/06 |
| 2022/0256484 A1* | 8/2022 | Xu | H04W 56/001 |
| 2023/0217499 A1* | 7/2023 | Jeon | H04L 1/1835 |
| 2023/0328795 A1 | 10/2023 | Yang | |
| 2024/0324020 A1* | 9/2024 | Zheng | H04W 72/115 |
| 2025/0234313 A1* | 7/2025 | Chen | H04B 17/327 |
| 2026/0040388 A1* | 2/2026 | Parichehrehteroujeni | H04W 76/27 |

FOREIGN PATENT DOCUMENTS

| | | |
|---|---|---|
| CN | 111800888 A | 10/2020 |
| CN | 112262597 A | 1/2021 |
| CN | 112449386 A | 3/2021 |

OTHER PUBLICATIONS

"Initial Consideration on RACH based SDT," NEC, 3GPP TSG-RAN WG2 #111 electronic, R2-2007195, dated Aug. 28, 2020.

"Supporting Small Data Transmission via RA Procedure," vivo, 3GPP TSG-RAN WG2 Meeting #112-electronic, R2-2008960, dated Nov. 13, 2020.

"Control Plane Common Aspects of RACH and CG based SDT," Samsung, 3GPP TSG-RAN2 Meeting #114 Electronic, R2-2104785, dated May 27, 2021.

First Office Action regarding Chinese Patent Application No. 202110904076.7, dated Sep. 29, 2025. Translation provided by Bohui Intellectual Property.

Extended European Search Report regading European Patent Application No. 22852306.4, dated Oct. 11, 2024.

"Failure handling for SDT," Ericsson, 3GPP TSG-RAN WG2 #115-e, R2-2108088, dated Aug. 16-Aug. 27, 2021.

Second Office Action regarding Chinese Patent Application No. 202110904076.7, dated Apr. 16, 2026. Translation provided by Bohui Intellectual Property.

* cited by examiner

INFORMATION REPORTING METHOD, TERMINAL, AND NETWORK SIDE DEVICE

CROSS-REFERENCE TO RELATED APPLICATIONS

This application is a Bypass Continuation application of PCT/CN2022/110307 filed on Aug. 4, 2022, which claims the priority of Chinese Patent Application No. 202110904076.7 filed on Aug. 6, 2021, the entire contents of which are hereby incorporated by reference.

TECHNICAL FIELD

This application relates to the field of wireless communication technologies, and specifically, to an information reporting method, a terminal, and a network side device.

BACKGROUND

In a new radio (NR) communication technology, a small data transmission (SDT) technology is introduced. In this way, a terminal (User Equipment, UE, also referred to as terminal device or user terminal) in an inactive state can efficiently transmit small data, and high signaling overheads caused in a radio resource control (RRC) state conversion and RRC connection establishment procedure can be avoided. In other words, the SDT technology can achieve small data transmission through a very simple signaling procedure.

However, when the UE supports SDT, once a problem, for example, an unreasonable parameter configuration, occurs in an SDT procedure, the SDT procedure fails, and wireless communication performance is affected.

SUMMARY

Embodiments of this application provide an information reporting method.

According to a first aspect, an information reporting method is provided, and includes: reporting, by a terminal, first information to a network side device, where the first information is information when the terminal executes a random access (RA) small data transmission SDT procedure.

According to a second aspect, an information reporting method is provided, and includes: receiving, by a network side device, first information, where the first information is information when a terminal executes a random access small data transmission RA SDT procedure; and sending, by the network side device, the first information to a target network device, where the target network device is a network device corresponding to a serving cell in which the RA SDT procedure occurs.

According to a third aspect, an information reporting apparatus is provided, and includes: a first transmission module, configured to report first information to a network side device, where the first information is information when a terminal executes a random access small data transmission RA SDT procedure.

Optionally, the first information includes at least one of the following: an identity (ID) of a serving cell that the terminal is in when the terminal initiates a random access channel (RACH); a reason why the terminal initiates the RACH; related information of the RACH; a first threshold, indicating a data volume threshold when the terminal executes the RA SDT procedure; a second threshold, indicating a reference signal received power (RSRP) threshold when the terminal executes the RA SDT procedure; a third threshold, indicating an RSRP threshold when the terminal executes the RA SDT procedure based on a 2-step random access procedure 2-step RACH; a fourth threshold, indicating an RSRP threshold when the terminal selects a synchronization signal block (SSB) based on the 2-step RACH procedure to execute the RA SDT procedure; a fifth threshold, indicating an RSRP threshold when the terminal selects an SSB based on a 4-step RACH procedure to execute the RA SDT procedure; first indication information, indicating whether a guide code selected by the terminal when executing the RA SDT procedure belongs to a group A or a group B; second indication information, indicating that the terminal has received a first command sent by the network side device, where the first command indicates the terminal to convert from an SDT procedure to a non-SDT procedure; or a first timer, indicating a time length for executing the RA SDT procedure by the terminal.

Optionally, the ID of the serving cell includes at least one of the following: an NR cell global identifier (NCGI); or an ID of a physical cell.

Optionally, in a case that the ID of the serving cell includes the ID of the physical cell, the first information further includes frequency information corresponding to the physical cell.

Optionally, the related information of the RACH includes at least one of the following: an absolute frequency position of a reference resource block; a frequency domain position and a bandwidth of a bandwidth part (BWP) associated with a random access resource used by the terminal; a sub-carrier spacing of the BWP associated with the random access resource used by the terminal; a time frequency resource of a message (Msg) 1; a time frequency resource of a Msg A; or information recorded by the terminal each time the terminal attempts to initiate an RACH procedure.

Optionally, the information recorded by the terminal each time the terminal attempts to initiate the RACH procedure includes at least one of the following: an index of an SSB corresponding to a random access attempt; an index of a physical broadcast channel (PBCH) corresponding to the random access attempt; an index of a channel state information reference signal (CSI-RS) corresponding to the random access attempt; measurement information of the CSI-RS corresponding to the random access attempt; measurement information of the SSB corresponding to the random access attempt; or measurement information of the PBCH corresponding to the random access attempt.

Optionally, the first threshold includes at least one of the following: a first value, where the first value is the data volume threshold, and the first value is for determining whether the terminal executes the RA SDT; a second value, where the second value is a sum of data volumes of to-be-transmitted data, and/or the to-be-transmitted data is data corresponding to a data radio bearer (DRB) supporting SDT on the terminal; or a difference between the first value and the second value.

Optionally, the second threshold includes at least one of the following: a third value, where the third value is the RSRP threshold, and the third value is for determining whether the terminal executes the RA SDT; a fourth value, where the fourth value is an RSRP value measured by the terminal when executing the RA SDT; or a difference between the third value and the fourth value.

Optionally, the third threshold includes at least one of the following: a fifth value, where the fifth value is the data volume threshold, and the fifth value is for determining whether the terminal executes the RA SDT based on the 2-step RACH; a sixth value, where the sixth value is an RSRP value measured by the terminal when executing the RA SDT; or a difference between the fifth value and the sixth value.

Optionally, the fourth threshold includes at least one of the following: a seventh value, where the seventh value is a threshold for screening SSBs when the terminal executes the RA SDT procedure based on the 2-step RACH; an eighth value, where the eighth value is an RSRP value obtained through measurement of the terminal based on the selected SSB; or a difference between the seventh value and the eighth value.

Optionally, the fifth threshold includes at least one of the following: a ninth value, where the ninth value is a threshold for screening SSBs when the terminal executes the RA SDT procedure based on the 4-step RACH; a tenth value, where the tenth value is an RSRP value obtained through measurement of the terminal based on the selected SSB; or a difference between the ninth value and the tenth value.

Optionally, the first transmission module is further configured to send third indication information to the network side device, where in a case that the first information includes the fourth threshold, the third indication information indicates a relationship between the eighth value and the seventh value to the network side device; and/or in a case that the first information includes the fifth threshold, the third indication information indicates a relationship between the ninth value and the tenth value to the network side device.

Optionally, the first command includes at least one of the following: a medium access control (MAC) random access response (RAR); a fallback RAR; or downlink control information (DCI).

Optionally, the length of the first timer is determined based on at least one of the following: a timing length of a second timer, where the second timer is configured to determine whether the RA SDT fails; a timing length of a third timer, where start time of the third timer is determined based on transmission time of a radio resource control RRC resume request, end time of the third timer is determined based on receiving time of second information or cell selection time, and the second information includes at least one of an RRC resume message, an RRC setup Setup message, an RRC release message, an RRC release with suspend configure Release with suspend Configure message, an RRC message, and a non access stratum (NAS) connection establishment interruption indication; or a difference between the timing length of the second timer and the timing length of the third timer.

Optionally, that the second timer is configured to determine whether the RA SDT fails includes: starting the second timer in a case that the terminal transmits the RRC resume request; and determining, in a case that the second timer times out, that the execution of the RA SDT fails, and executing a predetermined timeout behavior.

Optionally, the first information includes M RA procedure entries, and each RA procedure entry includes N RA attempt entries, where M is an integer greater than or equal to 1, and N is an integer greater than or equal to 0.

Optionally, the RA procedure entry includes at least one of the following: a 2-step RACH; or a 4-step RACH.

Optionally, each RA procedure entry includes at least one of an identity ID of a serving cell when the terminal initiates a random access channel RACH, a reason why the terminal initiates the RACH, a first threshold, a second threshold, a third threshold, a first timer, or related information of the RACH; and/or each RA procedure entry includes at least one of a fourth threshold, a fifth threshold, first indication information, or second indication information.

Optionally, the first transmission module is configured to send fourth indication information to the network side device, where the fourth indication information indicates that the terminal stores the first information; and report the first information to the network side device in a case that fifth indication information sent by the network side device is received.

Optionally, the fourth indication information and/or the fifth indication information is transmitted through radio resource control RRC signaling.

Optionally, the first transmission module is further configured to report a first capability to the network side device, where the first capability includes at least one of the following: a capability of the terminal to execute the 4-step RACH; a capability of the terminal to execute the 2-step RACH; or a capability of the terminal to execute the RA SDT or the SDT.

Optionally, the apparatus further includes: a determining module, configured to determine the first information based on target configuration information, where at least one of the following is configured in the target configuration information: whether the terminal enables recording of the first information; information about a region in which the terminal is allowed to record the first information; or a quantity of RA procedure entries allowed to be included in the first information, and a quantity of RA attempt entries included in each RA procedure entry.

According to a fourth aspect, an information reporting apparatus is provided, and includes: a second transmission module, configured to receive first information reported by a terminal, where the first information is information when the terminal executes a random access small data transmission RA SDT procedure; and send the first information to a target network device, where the target network device is a network device corresponding to a serving cell in which the RA SDT procedure occurs.

Optionally, the first information includes at least one of the following: an identity ID of a serving cell that the terminal is in when the terminal initiates a random access channel RACH; a reason why the terminal initiates the RACH; related information of the RACH; a first threshold, indicating a data volume threshold when the terminal executes the RA SDT procedure; a second threshold, indicating a reference signal received power RSRP threshold when the terminal executes the RA SDT procedure; a third threshold, indicating an RSRP threshold when the terminal executes the RA SDT procedure based on a 2-step random access procedure 2-step RACH; a fourth threshold, indicating an RSRP threshold when the terminal selects a synchronization signal block SSB based on the 2-step RACH procedure to execute the RA SDT procedure; a fifth threshold, indicating an RSRP threshold when the terminal selects an SSB based on a 4-step RACH procedure to execute the RA SDT procedure; first indication information, indicating whether a guide code selected by the terminal when executing the RA SDT procedure belongs to a group A or a group B; second indication information, indicating that the terminal has received a first command sent by a network side device, where the first command indicates the terminal to convert from an SDT procedure to a non-SDT procedure; or a first timer, indicating a time length for executing the RA SDT procedure by the terminal.

Optionally, the ID of the serving cell includes at least one of the following: an NR cell global identifier NCGI; or an ID of a physical cell.

Optionally, in a case that the ID of the serving cell includes the ID of the physical cell, the first information further includes frequency information corresponding to the physical cell.

Optionally, the related information of the RACH includes at least one of the following: an absolute frequency position of a reference resource block; a frequency domain position and a bandwidth of a bandwidth part BWP associated with a random access resource used by the terminal; a sub-carrier spacing of the BWP associated with the random access resource used by the terminal; a time frequency resource of a message Msg 1; a time frequency resource of a Msg A; or information recorded by the terminal each time the terminal attempts to initiate an RACH procedure.

Optionally, the information recorded by the terminal each time the terminal attempts to initiate the RACH procedure includes at least one of the following: an index of an SSB corresponding to a random access attempt; an index of a physical broadcast channel PBCH corresponding to the random access attempt; an index of a channel state information reference signal CSI-RS corresponding to the random access attempt; measurement information of the CSI-RS corresponding to the random access attempt; measurement information of the SSB corresponding to the random access attempt; or measurement information of the PBCH corresponding to the random access attempt.

Optionally, the first threshold includes at least one of the following: a first value, where the first value is the data volume threshold, and the first value is for determining whether the terminal executes the RA SDT; a second value, where the second value is a sum of data volumes of to-be-transmitted data, and the to-be-transmitted data is data corresponding to a data radio bearer DRB supporting SDT on the terminal; or a difference between the first value and the second value.

Optionally, the second threshold includes at least one of the following: a third value, where the third value is the RSRP threshold, and the third value is for determining whether the terminal executes the RA SDT; a fourth value, where the fourth value is an RSRP value measured by the terminal when executing the RA SDT; or a difference between the third value and the fourth value.

Optionally, the third threshold includes at least one of the following: a fifth value, where the fifth value is the data volume threshold, and the fifth value is for determining whether the terminal executes the RA SDT based on the 2-step RACH; a sixth value, where the sixth value is an RSRP value measured by the terminal when executing the RA SDT; or a difference between the fifth value and the sixth value.

Optionally, the fourth threshold includes at least one of the following: a seventh value, where the seventh value is a threshold for screening SSBs when the terminal executes the RA SDT procedure based on the 2-step RACH; an eighth value, where the eighth value is an RSRP value obtained through measurement of the terminal based on the selected SSB; or a difference between the seventh value and the eighth value.

Optionally, the fifth threshold includes at least one of the following: a ninth value, where the ninth value is a threshold for screening SSBs when the terminal executes the RA SDT procedure based on the 4-step RACH; a tenth value, where the tenth value is an RSRP value obtained through measurement of the terminal based on the selected SSB; or a difference between the ninth value and the tenth value.

Optionally, the second transmission module is further configured to send third indication information to the network side device, where in a case that the first information includes the fourth threshold, the third indication information indicates a relationship between the eighth value and the seventh value to the network side device; and/or in a case that the first information includes the fifth threshold, the third indication information indicates a relationship between the ninth value and the tenth value to the network side device.

Optionally, the first command includes at least one of the following: a medium access control MAC random access response RAR; a fallback RAR; or downlink control information DCI.

Optionally, the length of the first timer is determined based on at least one of the following: a timing length of a second timer, where the second timer is configured to determine whether the RA SDT fails; a timing length of a third timer, where start time of the third timer is determined based on transmission time of a radio resource control RRC resume request, end time of the third timer is determined based on receiving time of second information or cell selection time, and the second information includes at least one of an RRC resume message, an RRC setup Setup message, an RRC releasemessage, an RRC release with suspend configure Release with suspend Configure message, an RRC message, and a non access stratum NAS connection establishment interruption indication; or a difference between the timing length of the second timer and the timing length of the third timer.

Optionally, that the second timer is configured to determine whether the RA SDT fails includes: starting the second timer in a case that the terminal transmits the RRC resume request; and determining, in a case that the second timer times out, that the execution of the RA SDT fails, and executing a predetermined timeout behavior.

Optionally, the first information includes M RA procedure entries, and each RA procedure entry includes N RA attempt entries, where M is an integer greater than or equal to 1, and N is an integer greater than or equal to 0.

Optionally, the RA procedure entry includes at least one of the following: a 2-step RACH; or a 4-step RACH.

Optionally, each RA procedure entry includes at least one of an identity ID of a serving cell when the terminal initiates a random access channel RACH, a reason why the terminal initiates the RACH, a first threshold, a second threshold, a third threshold, a first timer, or related information of the RACH; and/or each RA procedure entry includes at least one of a fourth threshold, a fifth threshold, first indication information, or second indication information.

Optionally, the second transmission module is configured to receive fourth indication information sent by the terminal, where the fourth indication information indicates that the terminal stores the first information; and send fifth indication information to the terminal, where the fifth indication information indicates the terminal to report the first information.

Optionally, the fourth indication information and/or the fifth indication information is transmitted through radio resource control RRC signaling.

Optionally, the second transmission module is configured to receive a first capability reported by the terminal, where the first capability includes at least one of the following: a capability of the terminal to execute the 4-step RACH; a capability of the terminal to execute the 2-step RACH; or a capability of the terminal to execute the RA SDT or the SDT.

According to a fifth aspect, a terminal is provided. The terminal includes a processor, a memory, and a program or instructions stored in the memory and executable on the processor, the program or the instructions, when executed by the processor, implementing steps of the method according to the first aspect.

According to a sixth aspect, a terminal is provided. The terminal includes a processor and a communication interface, where the communication interface is coupled to the processor, and the processor is configured to run a program or instructions, to implement steps of the method according to the first aspect.

According to a seventh aspect, a network side device is provided. The network side device includes a processor, a memory, and a program or instructions stored in the memory and executable on the processor, the program or the instructions, when executed by the processor, implementing steps of the method according to the second aspect.

According to an eighth aspect, a network side device is provided, including a processor and a communication interface, where the communication interface is coupled to the processor, and the processor is configured to run a program or instructions, to implement steps of the method according to the second aspect.

According to a ninth aspect, a non-transitory readable storage medium is provided. The non-transitory readable storage medium stores a program or instructions, the program or the instructions, when executed by a processor, implementing steps of the method according to the first aspect, or implementing steps of the method according to the second aspect.

According to a tenth aspect, a chip is provided. The chip includes a processor and a communication interface, where the communication interface is coupled to the processor, and the processor is configured to run a program or instructions, to implement steps of the method according to the first aspect, or implement steps of the method according to the second aspect.

According to an eleventh aspect, a computer program/program product is provided. The computer program/program product is stored in a non-transitory storage medium. The computer program/program product is executed by at least one processor, to implement steps of the method according to the first aspect, or implement steps of the method according to the second aspect.

DETAILED DESCRIPTION

The following clearly describes the technical solutions in embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application fall within the protection scope of this application.

The specification and claims of this application, and terms "first" and "second" are used to distinguish similar objects, but are unnecessarily used to describe a specific sequence or order. It should be understood that the terms in such a way are interchangeable in proper circumstances, so that the embodiments of this application can be implemented in other orders than the order illustrated or described herein. Objects distinguished by "first" and "second" are usually one type, and the quantity of objects is not limited. For example, the first object may be one or more than one. In addition, in the specification and the claims, "and/or" means at least one of the connected objects, and the character "/" generally indicates an "or" relationship between the associated objects.

It should be noted that, the technologies described in the embodiments of this application are not limited to a long term evolution (LTE) system or an LTE-advanced (LTE-A) system, and can also be used in other wireless communication systems, such as, code division multiple access (CDMA), time division multiple access (TDMA), frequency division multiple access (FDMA), orthogonal frequency division multiple access (OFDMA), and single-carrier frequency-division multiple access (SC-FDMA). The terms "system" and "network" in the embodiments of this application are often used interchangeably, and the described technology can be used not only for the above systems and radio technologies, but also for other systems and radio technologies. The following description describes a new radio (NR) system for example objectives, and NR terms are used in most of the description below, although these technologies are also applicable to applications other than NR system applications, such as a 6-th generation (6G) communication system.

Figure 1:
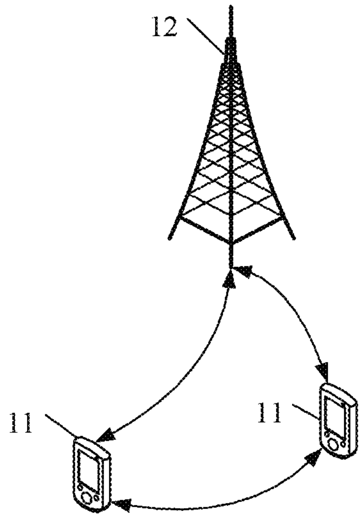
FIG. 1 is a schematic diagram of a structure of a wireless communication system according to an exemplary embodiment of this application.

FIG. 1 is a schematic diagram of a structure of a wireless communication system to which the embodiments of this application are applicable. The wireless communication system includes a terminal 11 and a network side device 12. The terminal 11 may also be referred to as a terminal device or a user terminal (User Equipment, UE). The terminal 11 may be a terminal side device such as a mobile phone, a tablet computer (Tablet Personal Computer), a laptop computer or referred to as a notebook computer, a personal digital assistant (PDA), a palm computer, a netbook, an ultra-mobile personal computer (UMPC), a mobile Internet device (MID), a wearable device or in-vehicle equipment (VUE), or a pedestrian terminal (PUE). The wearable device includes: a smart watch, a bracelet, a headphone, glasses, or the like. It should be noted that, a specific type of the terminal 11 is not limited in embodiments of this application. The network side device 12 may be a base station or a core network, where the base station may be referred to as a Node B, an evolved nodeB, an access point, a base transceiver station (BTS), a radio base station, a radio transceiver, a basic service set (BSS), an extended service set (ESS), a nodeB, an evolved nodeB (eNB), a home nodeB, a home evolved nodeB, a WLAN access point, a WiFi node, a transmitting receiving point (TRP), or another appropriate term in the field, as long as the same technical effect is achieved. The base station is not limited to a specific technical term. It should be noted that, a base station in the NR system is used as an example in the embodiments of this application, but a specific type of the base station is not limited.

Technical solutions provided in the embodiments of this application are described below through some embodiments and application scenarios thereof with reference to the accompanying drawings.

Figure 2:
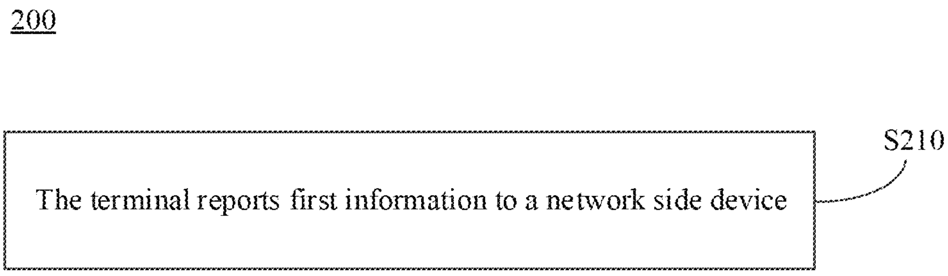
FIG. 2 is a schematic flowchart of an information reporting method according to an exemplary embodiment of this application.

FIG. 2 is a schematic flowchart of an information reporting method 200 according to an exemplary embodiment of this application. The method 200 may be executed by but not limited to a terminal, and may be executed by hardware or/and software installed in a terminal. In this embodiment, the method 200 may include at least the following step.

S210: The terminal reports first information to a network side device.

The first information is information when the terminal executes a random access (RA) SDT procedure, for example, when the terminal evaluates initial SDT, information about whether a configuration or procedure can meet information about an evaluation condition, related information when the terminal successfully executes the SDT, or related information when the execution of the terminal for the SDT fails (for example, a reason for the failure, and related configuration information in case of failure). This is not limited in this embodiment.

Correspondingly, after the first information is received, the network side device may forward the first information to another network node. The another network node may be a target network node corresponding to a cell that the terminal is in when the RA SDT procedure occurs. In this way, the target network node can adaptively adjust and modify configured SDT parameters based on the first information, to ensure successful execution of the subsequent RA SDT procedure and improve stability and reliability of wireless communication. A serving cell corresponding to the target network node may be determined based on an identity or the like of a serving cell included in the first information, or the serving cell corresponding to the target network node may be agreed in a protocol, configured by the network side device, or the like, which is not limited herein.

In this embodiment, a terminal reports first information to a network side device, so that the network side device can be assisted to adaptively adjust and modify configured SDT parameters, to ensure successful execution of an RA SDT procedure and improve stability and reliability of wireless communication.

For example, if the network side device configures RA SDT for the terminal, but a problem occurs when the terminal executes the RA SDT procedure, or the RA SDT is not successfully executed due to an unreasonable SDT parameter configuration, the terminal may report related information (namely, the first information) to the network side device, so that the network side device can be assisted to modify the SDT parameter configuration, to ensure smooth execution of the subsequent RA SDT procedure.

Figure 3:
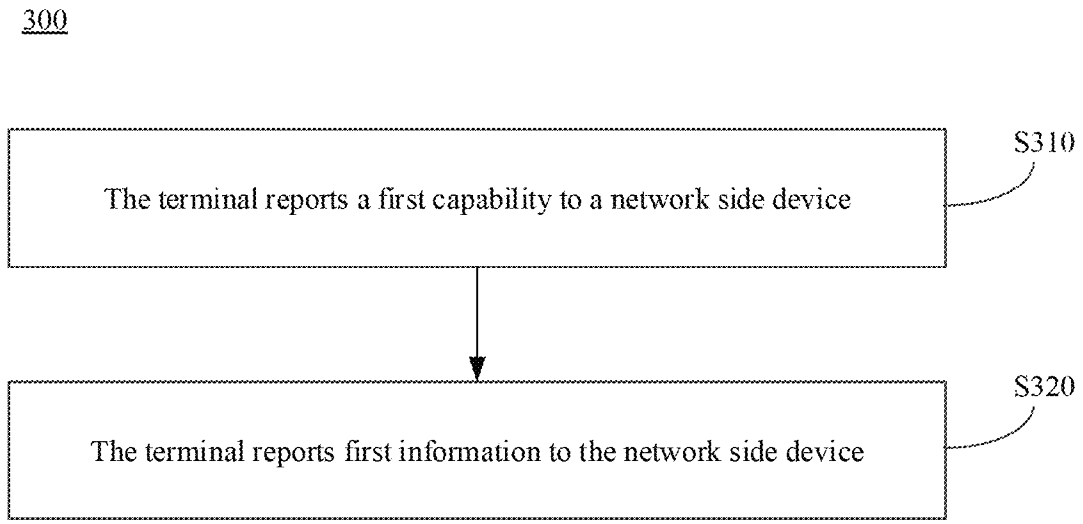
FIG. 3 is a schematic flowchart of an information reporting method according to another exemplary embodiment of this application.

FIG. 3 is a schematic flowchart of an information reporting method 300 according to an exemplary embodiment of this application. The method 300 may be executed by but not limited to a terminal, and may be executed by hardware or/and software installed in a terminal. In this embodiment, the method 300 may include at least the following steps.

S310: The terminal reports a first capability to a network side device.

The first capability represents that the terminal has a capability to execute SDT or the terminal may have SDT information.

Optionally, in this embodiment, the first capability may include at least one of the following (101) to (103).

(101) A capability of the terminal to execute the 4-step random access procedure (4-step random access channel (RACH)).

The 4-step RACH may be understood as triggering to perform SDT in the 4-step random access procedure.

(102) A capability of the terminal to execute the 2-step RACH.

The 2-step RACH may be understood as triggering to perform SDT in the 2-step random access procedure.

(103) A capability of the terminal to execute the RA SDT or the SDT.

The capability of the terminal to execute the SDT may be understood as: The RA SDT and configured grant (CG) SDT are distinguished, in other words, it can be considered that the terminal has an SDT capability as long as the terminal can execute the SDT.

S320: The terminal reports first information to the network side device.

The first information is information when the terminal executes an RA SDT procedure.

It may be understood that, for an implementation procedure of S320, in addition to referring to related description in the embodiment of the method 200, in a possible implementation, the first information may include at least one of the following (301) to (311).

(301) An identity (ID) of a serving cell that the terminal is in when the terminal initiates a random access channel RACH.

The ID of the serving cell may include at least one of the following (301*a*) and (301*b*).

(301*a*) An NR cell global identifier (NCGI).

(301*b*) An ID of a physical cell. Optionally, in a case that the ID of the serving cell includes the ID of the physical cell, the first information may further include frequency information corresponding to the physical cell.

(302) A reason why the terminal initiates the RACH.

The reason may be that current RACH is initiated because the terminal intends to perform SDT (that is, RA-SDT initiated), or the like.

(303) Related information of the RACH.

In an implementation, the related information of the RACH may include at least one of the following (3031) to (3036).

(3031) An absolute frequency position of a reference resource block.

(3032) A frequency domain position and a bandwidth of a bandwidth part BWP associated with a random access resource used by the terminal.

(3033) A sub-carrier spacing of the BWP associated with the random access resource used by the terminal.

(3034) A time frequency resource of a message (Msg) 1.

(3035) A time frequency resource of a Msg A.

(3036) Information recorded by the terminal each time the terminal attempts to initiate an RACH procedure.

In an implementation, the information recorded by the terminal each time the terminal attempts to initiate the RACH procedure may include at least one of the following (3036*a*) to (3036*f*).

(3036*a*) An index of a synchronization signal block (SSB) corresponding to a random access attempt.

(3036*b*) An index of a physical broadcast channel (PBCH) corresponding to the random access attempt.

(3036*c*) An index of a channel state information reference signal (CSI-RS) corresponding to the random access attempt.

(3036*d*) Measurement information of the CSI-RS corresponding to the random access attempt.

(3036*e*) Measurement information of the SSB corresponding to the random access attempt.

(3036*f*) Measurement information of the PBCH corresponding to the random access attempt.

The measurement information in (3036*d*) to (3036*f*) may be time frequency domain information, a periodicity, and the like related to measurement, which is not limited herein.

(304) A first threshold, indicating a data volume threshold when the terminal executes the RA SDT procedure.

The data volume threshold may be an SDT data volume threshold or the like. In an implementation, the first threshold may include at least one of the following (304*a*) to (304*c*).

(304*a*) A first value, where the first value is the data volume threshold, and the first value is for determining whether the terminal executes the RA SDT. The first value may be configured by a network side, which is not limited herein.

(304*b*) A second value, where the second value is a sum of data volumes of to-be-transmitted data, and the to-be-transmitted data is data corresponding to a data radio bearer (DRB, that is, SDT-enabled DRB) supporting SDT on the terminal.

(304*c*) A difference between the first value and the second value.

(305) A second threshold, indicating a reference signal received power RSRP threshold when the terminal executes the RA SDT procedure.

In an implementation, the second threshold includes at least one of the following (305*a*) to (305*c*).

(305*a*) A third value, where the third value is the reference signal received power (RSRP) threshold, and the third value is for determining whether the terminal executes the RA SDT. In this embodiment, the third value may be configured by the network side device, agreed in a protocol, configured by a high layer, or the like, which is not limited herein.

(305*b*) A fourth value, where the fourth value is an RSRP value measured by the terminal when executing the RA SDT. In other words, the fourth value may be obtained through measurement of the terminal based on a measurement resource configured by the network side, and the measurement resource may be a CSI-RS, an SSB, or the like.

(305*c*) A difference between the third value and the fourth value.

(306) A third threshold, indicating an RSRP threshold when the terminal executes the RA SDT procedure based on a 2-step RACH.

In an implementation, the third threshold may include at least one of the following (306*a*) to (306*c*).

(306*a*) A fifth value, where the fifth value is the data volume threshold, and the fifth value is for determining whether the terminal executes the RA SDT based on the 2-step RACH.

(306*b*) A sixth value, where the sixth value is an RSRP value measured by the terminal when executing the RA SDT.

Similar to (305*b*), the sixth value may be obtained through measurement of the terminal based on a measurement resource configured by the network side, and the measurement resource may be a CSI-RS, an SSB, or the like.

(306*c*) A difference between the fifth value and the sixth value.

(307) A fourth threshold, indicating an RSRP threshold when the terminal selects a synchronization signal block SSB based on the 2-step RACH procedure to execute the RA SDT procedure.

In an implementation, the fourth threshold may include at least one of the following (307*a*) to (307*c*).

(307*a*) A seventh value, where the seventh value is a threshold for screening SSBs when the terminal executes the RA SDT procedure based on the 2-step RACH. In other words, the seventh value may be a threshold that is configured by a network and that is for screening the SSBs when the terminal executes the RA SDT.

(307*b*) An eighth value, where the eighth value is an RSRP value obtained through measurement of the terminal based on the selected SSB. In other words, the eighth value is a real/actual RSRP value obtained through the measurement of the terminal based on the currently selected SSB.

(307*c*) A difference between the seventh value and the eighth value.

In this case, if no SSB can meet a threshold when the terminal selects an SSB, for CG SDT, any SSB is not selected to perform the CG SDT. However, for RA SDT, if no SSB meets the threshold, an SSB may be arbitrarily selected to perform the RA SDT. In this case, for the RA SDT, it appears that the eighth value actually measured by the terminal is higher than or lower than an SSB threshold (namely, the seventh value); and for the CG SDT, the eighth value actually measured by the terminal is only higher than the preset SSB threshold.

Based on this, in a possible implementation, for the RA SDT, the terminal may send third indication information to the network side device, to indicate a relationship between the eighth value and the seventh value to the network side device. For example, the RSRP value obtained through the measurement of the terminal based on the selected SSB is higher than or lower than the seventh value. In this embodiment, that flag=1 indicates higher, that flag=0 indicates lower, which are indicated by 1 bit.

(308) A fifth threshold, indicating an RSRP threshold when the terminal selects an SSB based on a 4-step RACH procedure to execute the RA SDT procedure.

In an implementation, the fifth threshold may include at least one of the following (308*a*) to (308*c*).

(308*a*) A ninth value, where the ninth value is a threshold for screening SSBs when the terminal executes the RA SDT procedure based on the 4-step RACH.

(308*b*) A tenth value, where the tenth value is an RSRP value obtained through measurement of the terminal based on the selected SSB.

(308*c*) A difference between the ninth value and the tenth value.

Based on this, the terminal may send third indication information to the network side device, to indicate a relationship between the ninth value and the tenth value to the network side device.

It should be noted that, the third indication information may be sent by the terminal after sending the first information, or may be carried in the first information and sent, or may be simultaneously sent with the first information. A sending order of the third indication information is not limited in this embodiment.

It may be understood that, for an implementation procedure in (308), refer to description in (307). To avoid repetition, details are not described herein again.

(309) First indication information, indicating whether a guide code selected by the terminal when executing the RA SDT procedure belongs to a group A or a group B.

It may be understood that, in related arts, there are a total of 64 RACH guide codes, and the 64 guide codes are divided into the group A and the group B. In this case, in this embodiment, the terminal reports the first indication information, so that the network side device knows whether the guide code selected by the terminal when executing the RA SDT procedure belongs to the group A or the group B.

(310) Second indication information, indicating that the terminal has received a first command sent by the network side device, where the first command indicates the terminal to convert from an SDT procedure to a non-SDT procedure.

In an implementation, the first command may include at least one of the following (310*a*) to (310*c*).

(310*a*) A medium access control (MAC) random access response (RAR).

(310*b*) A fallback RAR.

(310*c*) Downlink control information (DCI).

It should be noted that, in this embodiment, the first command may be a display command, a privacy command, or the like, which is not limited herein.

(311) A first timer, indicating a time length for executing the RA SDT procedure by the terminal.

In an implementation, the length of the first timer may be determined based on at least one of the following (311*a*) to (311*c*).

(311*a*) A timing length of a second timer, where the second timer is configured to determine whether the RA SDT fails. In other words, the second timer may be an SDT failure detection timer.

In this embodiment, a working procedure of the second timer may include: starting the second timer in a case that the terminal transmits an RRC resume request (Resume Request 1); and determining, in a case that the second timer times out (or expires), that the execution of the RA SDT fails, and executing a predetermined timeout behavior.

Optionally, the predetermined timeout behavior may be: entering an idle state, recording failure in a connection establishment failure report, or the like.

(311*b*) A timing length of a third timer, where start time of the third timer is determined based on transmission time of a radio resource control RRC resume request, end time of the third timer is determined based on receiving time of second information or cell selection time, and the second information includes at least one of an RRC resume message, an RRC setup message, an RRC release message, an RRC release with suspend configure message, an RRC message, or a non access stratum (NAS) connection establishment interruption indication.

(311*c*) A difference between the timing length of the second timer and the timing length of the third timer.

In an implementation, the first information may include part or all of the information in (301) to (311), or may include more or less information than (301) to (311), which is not limited herein. In addition, when transmitting the first information, the terminal may include the first information in a logged minimization of drive tests (logged MDT) report, an RACH report, a connection establishment failure (CEF) report, a new report dedicated to transmission of the first information, or the like, which is not limited herein.

In this embodiment of this application, through designing of first information and reporting of a first capability, a network side device can adaptively adjust and modify configured SDT parameters based on the first information, to improve stability and reliability of wireless communication while ensuring better execution of a CG SDT procedure.

Figure 4:
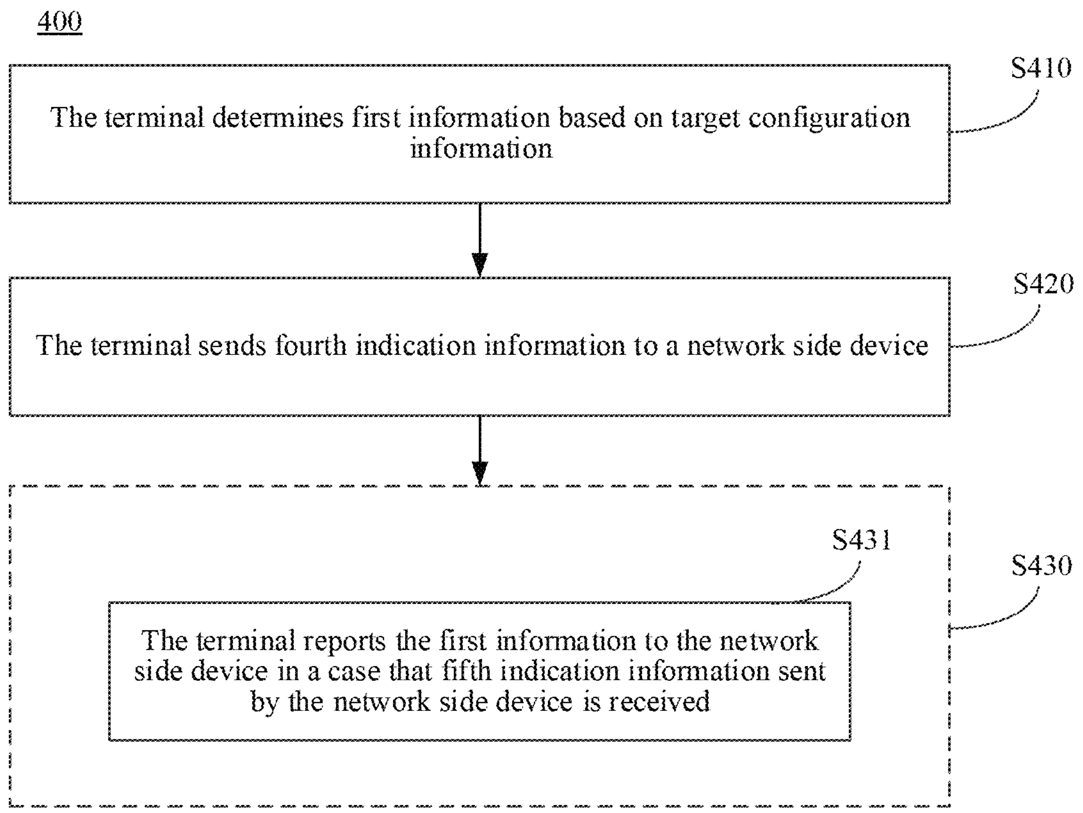
FIG. 4 is a schematic flowchart of an information reporting method according to still another exemplary embodiment of this application.

FIG. 4 is a schematic flowchart of an information reporting method 400 according to an exemplary embodiment of this application. The method 400 may be executed by but not limited to a terminal, and may be executed by hardware or/and software installed in a terminal. In this embodiment, the method 400 may include at least the following steps.

S410: The terminal determines first information based on target configuration information.

The target configuration information may be agreed in a protocol, configured by a high layer, configured by a network side, or the like. In an implementation, at least one of the following (501) to (503) may be configured in the target configuration information.

(501) Whether the terminal enables recording of the first information.

In other words, whether the terminal is allowed to start recording of RA SDT information.

(502) Information about a region in which the terminal is allowed to record the first information.

In other words, the terminal may record the first information in which regions.

(503) A quantity of RA procedure entries allowed to be included in the first information, and a quantity of RA attempt entries included in each RA procedure entry.

It may be understood that, in this embodiment, when the terminal reports the first information, the first information may include at most M RA procedure entries, and each RA procedure entry includes N RA attempt entries, where M is an integer greater than or equal to 1, and N is an integer greater than or equal to 0. Optionally, M and N may be agreed in a protocol, predefined in a protocol, configured by a network, configured by a high layer, or the like, which are not limited herein.

In an implementation, the RA procedure entry may include: a 2-step RACH; and/or a 4-step RACH.

In another implementation, each RA procedure entry may include at least one of an ID of a serving cell when the terminal initiates an RACH, a reason why the terminal initiates the RACH, a first threshold, a second threshold, a third threshold, a first timer, or related information of the RACH; and/or each RA procedure entry includes at least one of a fourth threshold, a fifth threshold, first indication information, or second indication information.

It may be understood that, for implementation procedures of the ID of the serving cell when the terminal initiates the RACH, the reason why the terminal initiates the RACH, the first threshold, the second threshold, the third threshold, the first timer, the related information of the RACH, the fourth threshold, the fifth threshold, the first indication information, and the second indication information, refer to related description in the embodiment of the method 300. To avoid repetition, details are not described herein again.

In addition, the "determining the first information" may be understood as recording the first information, storing the first information, and the like, which is not limited herein.

S420: The terminal sends fourth indication information to a network side device.

The fourth indication information indicates that the terminal stores the first information, so that the network side device may determine whether the terminal is required to report the first information based on a communication requirement.

Optionally, the fourth indication information may be transmitted through radio resource control (RRC) signaling.

S430: The terminal reports the first information to the network side device.

the first information is information when a terminal executes an RA SDT procedure.

It may be understood that, for an implementation procedure of S430, in addition to referring to related description in the embodiment of the method 200 and/or 300, in a possible implementation, refer to FIG. 4 again. The implementation procedure of S430 may further include S431.

S431: The terminal reports the first information to the network side device in a case that fifth indication information sent by the network side device is received.

Similar to the fourth indication information, the fifth indication information may alternatively be transmitted through RRC signaling, which is not limited herein.

In addition, in a possible implementation, in addition to sending the fifth indication information to the terminal in a case that the fourth indication information is received, the network side device may alternatively send the fifth indication information to the terminal in a case that the terminal initiates the RACH and successfully accesses the network side device. This is not limited in this embodiment.

In this embodiment of this application, a terminal implements reporting of first information through negotiation with a network side device, so that the network side device can adaptively adjust and modify configured SDT parameters based on the first information, to improve stability and reliability of wireless communication while ensuring better execution of a CG SDT procedure.

Figure 5:
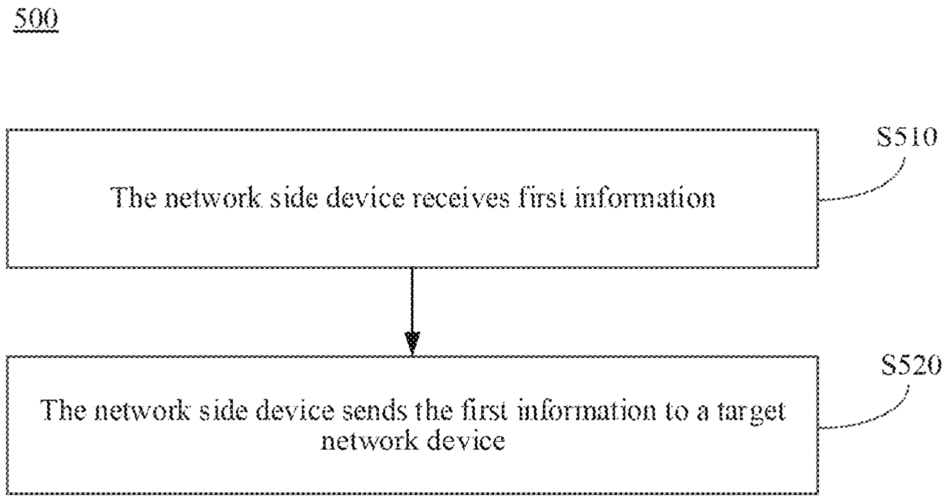
FIG. 5 is a schematic flowchart of an information reporting method according to still another exemplary embodiment of this application.

FIG. 5 is a schematic flowchart of an information reporting method 500 according to an exemplary embodiment of this application. The method 500 may be executed by but not limited to a network side device, and may be executed by software or/and hardware installed in a network side device. In this embodiment, the method 500 may include at least the following steps.

S510: The network side device receives first information, where the first information is information when a terminal executes a random access small data transmission RA SDT procedure.

S520: The network side device sends the first information to a target network device, where the target network device is a network device corresponding to a serving cell in which the RA SDT procedure occurs.

It should be noted that, in this embodiment, optionally, the first information may be sent by the terminal when executing the RA SDT procedure, or may be sent by the terminal after executing the RA SDT procedure. The first information may be information that is recorded when the terminal executes the RA SDT procedure and that is related to the RA SDT procedure.

In a possible implementation, the first information includes at least one of the following: an ID of a serving cell that the terminal is in when the terminal initiates a random access channel RACH; a reason why the terminal initiates the RACH; related information of the RACH; a first threshold, indicating a data volume threshold when the terminal executes the RA SDT procedure; a second threshold, indicating a reference signal received power RSRP threshold when the terminal executes the RA SDT procedure; a third threshold, indicating an RSRP threshold when the terminal executes the RA SDT procedure based on a 2-step random access procedure 2-step RACH; a fourth threshold, indicating an RSRP threshold when the terminal selects a synchronization signal block SSB based on the 2-step RACH procedure to execute the RA SDT procedure; a fifth threshold, indicating an RSRP threshold when the terminal selects an SSB based on a 4-step RACH procedure to execute the RA SDT procedure; first indication information, indicating whether a guide code selected by the terminal when executing the RA SDT procedure belongs to a group A or a group B; second indication information, indicating that the terminal has received a first command sent by the network side device, where the first command indicates the terminal to convert from an SDT procedure to a non-SDT procedure; or a first timer, indicating a time length for executing the RA SDT procedure by the terminal.

In another possible implementation, the ID of the serving cell includes at least one of the following: an NR cell global identifier NCGI; or an ID of a physical cell.

In another possible implementation, in a case that the ID of the serving cell includes the ID of the physical cell, the first information further includes frequency information corresponding to the physical cell.

In another possible implementation, the related information of the RACH includes at least one of the following: an absolute frequency position of a reference resource block; a frequency domain position and a bandwidth of a bandwidth part BWP associated with a random access resource used by the terminal; a sub-carrier spacing of the BWP associated with the random access resource used by the terminal; a time frequency resource of a message Msg 1; a time frequency resource of a Msg A; or information recorded by the terminal each time the terminal attempts to initiate an RACH procedure.

In another possible implementation, the information recorded by the terminal each time the terminal attempts to initiate the RACH procedure includes at least one of the following: an index of an SSB corresponding to a random access attempt; an index of a physical broadcast channel PBCH corresponding to the random access attempt; an index of a channel state information reference signal CSI-RS corresponding to the random access attempt; measurement information of the CSI-RS corresponding to the random access attempt; measurement information of the SSB corresponding to the random access attempt; or measurement information of the PBCH corresponding to the random access attempt.

In another possible implementation, the first threshold includes at least one of the following: a first value, where the first value is the data volume threshold, and the first value is for determining whether the terminal executes the RA SDT; a second value, where the second value is a sum of data volumes of to-be-transmitted data, and the to-be-transmitted data is data corresponding to a data radio bearer DRB supporting SDT on the terminal; or a difference between the first value and the second value.

In another possible implementation, the second threshold includes at least one of the following: a third value, where the third value is the RSRP threshold, and the third value is for determining whether the terminal executes the RA SDT; a fourth value, where the fourth value is an RSRP value measured by the terminal when executing the RA SDT; or a difference between the third value and the fourth value.

In another possible implementation, the third threshold includes at least one of the following: a fifth value, where the fifth value is the data volume threshold, and the fifth value is for determining whether the terminal executes the RA SDT based on the 2-step RACH; a sixth value, where the sixth value is an RSRP value measured by the terminal when executing the RA SDT; or a difference between the fifth value and the sixth value.

In another possible implementation, the fourth threshold includes at least one of the following: a seventh value, where the seventh value is a threshold for screening SSBs when the terminal executes the RA SDT procedure based on the 2-step RACH; an eighth value, where the eighth value is an RSRP value obtained through measurement of the terminal based on the selected SSB; or a difference between the seventh value and the eighth value.

In another possible implementation, the fifth threshold includes at least one of the following: a ninth value, where the ninth value is a threshold for screening SSBs when the terminal executes the RA SDT procedure based on the 4-step RACH; a tenth value, where the tenth value is an RSRP value obtained through measurement of the terminal based on the selected SSB; or a difference between the ninth value and the tenth value.

In another possible implementation, the method further includes: sending, by the terminal, third indication information to the network side device, where in a case that the first information includes the fourth threshold, the third indication information indicates a relationship between the eighth value and the seventh value to the network side device; and/or in a case that the first information includes the fifth threshold, the third indication information indicates a relationship between the ninth value and the tenth value to the network side device.

In another possible implementation, the first command includes at least one of the following: a medium access control MAC random access response RAR; a fallback RAR; or downlink control information DCI.

In another possible implementation, the length of the first timer is determined based on at least one of the following: a timing length of a second timer, where the second timer is configured to determine whether the RA SDT fails; a timing length of a third timer, where start time of the third timer is determined based on transmission time of a radio resource control RRC resume request, end time of the third timer is determined based on receiving time of second information or cell selection time, and the second information includes at least one of an RRC resume message, an RRC setup Setup message, an RRC releasemessage, an RRC release with suspend configure Release with suspend Configure message, an RRC message, and a non access stratum NAS connection establishment interruption indication; or a difference between the timing length of the second timer and the timing length of the third timer.

In another possible implementation, that the second timer is configured to determine whether the RA SDT fails includes: starting the second timer in a case that the terminal transmits the RRC resume request; and determining, in a case that the second timer times out, that the execution of the RA SDT fails, and executing a predetermined timeout behavior.

In another possible implementation, the first information includes M RA procedure entries, and each RA procedure entry includes N RA attempt entries, where M is an integer greater than or equal to 1, and N is an integer greater than or equal to 0.

In another possible implementation, the RA procedure entry includes at least one of the following: a 2-step RACH; or a 4-step RACH.

In another possible implementation, each RA procedure entry includes at least one of an identity ID of a serving cell when the terminal initiates a random access channel RACH, a reason why the terminal initiates the RACH, a first threshold, a second threshold, a third threshold, a first timer, or related information of the RACH; and/or each RA procedure entry includes at least one of a fourth threshold, a fifth threshold, first indication information, or second indication information.

In another possible implementation, that the network side device receives first information includes: receiving, by the network side device, fourth indication information sent by the terminal, where the fourth indication information indicates that the terminal stores the first information; and sending, by the network side device, fifth indication information to the terminal, where the fifth indication information indicates the terminal to report the first information.

In another possible implementation, the fourth indication information and/or the fifth indication information is transmitted through radio resource control RRC signaling.

In another possible implementation, before the network side device receives first information, the method further includes: receiving, by the network side device, a first capability reported by the terminal, where the first capability includes at least one of the following: a capability of the terminal to execute the 4-step RACH; a capability of the terminal to execute the 2-step RACH; or a capability of the terminal to execute the RA SDT or the SDT.

It may be understood that, for implementation procedures of various implementations provided in this embodiment, refer to description in the embodiments of the methods 200 to 400. To avoid repetition, details are not described herein again.

In this embodiment, a terminal reports first information to a network side device, so that the network side device can adaptively adjust and modify configured SDT parameters, to ensure successful execution of an RA SDT procedure and improve stability and reliability of wireless communication.

It should be noted that, in the information reporting methods 200 to 500 provided in the embodiments of this application, an execution entity may be an information reporting apparatus, or a control module configured to execute the information reporting method in the information reporting apparatus. In this embodiment of this application, an example in which the information reporting apparatus executes the information reporting method is used to describe the information reporting apparatus provided in the embodiments of this application.

Figure 6:
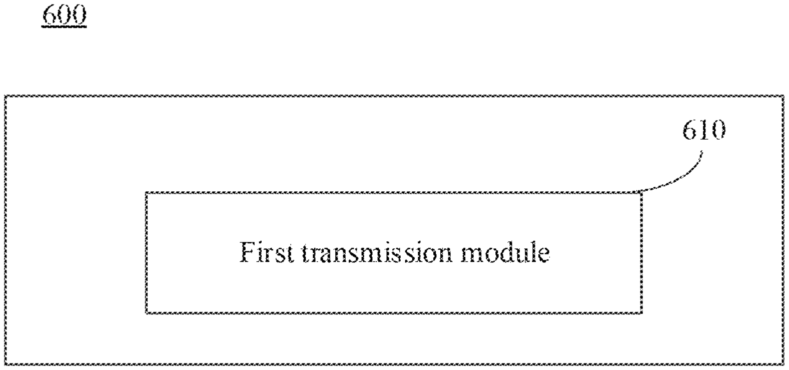
FIG. 6 is a schematic diagram of a structure of an information reporting apparatus according to an exemplary embodiment of this application.

FIG. 6 is a schematic diagram of a structure of an information reporting apparatus 600 according to an exemplary embodiment of this application. The apparatus 600 includes: a first transmission module 610, configured to report first information to a network side device, where the first information is information when a terminal executes an RA SDT procedure.

In a possible implementation, the apparatus 600 further includes a determining module, where the determining module is configured to determine the first information.

In a possible implementation, the first information includes at least one of the following: an ID of a serving cell that the terminal is in when the terminal initiates an RACH;

a reason why the terminal initiates the RACH; related information of the RACH; a first threshold, indicating a data volume threshold when the terminal executes the RA SDT procedure; a second threshold, indicating a reference signal received power RSRP threshold when the terminal executes the RA SDT procedure; a third threshold, indicating an RSRP threshold when the terminal executes the RA SDT procedure based on a 2-step RACH; a fourth threshold, indicating an RSRP threshold when the terminal selects an SSB based on the 2-step RACH procedure to execute the RA SDT procedure; a fifth threshold, indicating an RSRP threshold when the terminal selects an SSB based on a 4-step RACH procedure to execute the RA SDT procedure; first indication information, indicating whether a guide code selected by the terminal when executing the RA SDT procedure belongs to a group A or a group B; second indication information, indicating that the terminal has received a first command sent by the network side device, where the first command indicates the terminal to convert from an SDT procedure to a non-SDT procedure; or a first timer, indicating a time length for executing the RA SDT procedure by the terminal.

In another possible implementation, the ID of the serving cell includes at least one of the following: an NR cell global identifier NCGI; or an ID of a physical cell.

In another possible implementation, in a case that the ID of the serving cell includes the ID of the physical cell, the first information further includes frequency information corresponding to the physical cell.

In another possible implementation, the related information of the RACH includes at least one of the following: an absolute frequency position of a reference resource block; a frequency domain position and a bandwidth of a bandwidth part BWP associated with a random access resource used by the terminal; a sub-carrier spacing of the BWP associated with the random access resource used by the terminal; a time frequency resource of a message Msg 1; a time frequency resource of a Msg A; or information recorded by the terminal each time the terminal attempts to initiate an RACH procedure.

In another possible implementation, the information recorded by the terminal each time the terminal attempts to initiate the RACH procedure includes at least one of the following: an index of an SSB corresponding to a random access attempt; an index of a physical broadcast channel PBCH corresponding to the random access attempt; an index of a channel state information reference signal CSI-RS corresponding to the random access attempt; measurement information of the CSI-RS corresponding to the random access attempt; measurement information of the SSB corresponding to the random access attempt; or measurement information of the PBCH corresponding to the random access attempt.

In another possible implementation, the first threshold includes at least one of the following: a first value, where the first value is the data volume threshold, and the first value is for determining whether the terminal executes the RA SDT; a second value, where the second value is a sum of data volumes of to-be-transmitted data, and the to-be-transmitted data is data corresponding to a data radio bearer DRB supporting SDT on the terminal; or a difference between the first value and the second value.

In another possible implementation, the second threshold includes at least one of the following: a third value, where the third value is the RSRP threshold, and the third value is for determining whether the terminal executes the RA SDT; a fourth value, where the fourth value is an RSRP value measured by the terminal when executing the RA SDT; or a difference between the third value and the fourth value.

In another possible implementation, the third threshold includes at least one of the following: a fifth value, where the fifth value is the data volume threshold, and the fifth value is for determining whether the terminal executes the RA SDT based on the 2-step RACH; a sixth value, where the sixth value is an RSRP value measured by the terminal when executing the RA SDT; or a difference between the fifth value and the sixth value.

In another possible implementation, the fourth threshold includes at least one of the following: a seventh value, where the seventh value is a threshold for screening SSBs when the terminal executes the RA SDT procedure based on the 2-step RACH; an eighth value, where the eighth value is an RSRP value obtained through measurement of the terminal based on the selected SSB; or a difference between the seventh value and the eighth value.

In another possible implementation, the fifth threshold includes at least one of the following: a ninth value, where the ninth value is a threshold for screening SSBs when the terminal executes the RA SDT procedure based on the 4-step RACH; a tenth value, where the tenth value is an RSRP value obtained through measurement of the terminal based on the selected SSB; or a difference between the ninth value and the tenth value.

In another possible implementation, the first transmission module 610 is further configured to send third indication information to the network side device, where in a case that the first information includes the fourth threshold, the third indication information indicates a relationship between the eighth value and the seventh value to the network side device; and/or in a case that the first information includes the fifth threshold, the third indication information indicates a relationship between the ninth value and the tenth value to the network side device.

In another possible implementation, the first command includes at least one of the following: a medium access control MAC random access response RAR; a fallback RAR; or downlink control information DCI.

In another possible implementation, the length of the first timer is determined based on at least one of the following: a timing length of a second timer, where the second timer is configured to determine whether the RA SDT fails; a timing length of a third timer, where start time of the third timer is determined based on transmission time of a radio resource control RRC resume request, end time of the third timer is determined based on receiving time of second information or cell selection time, and the second information includes at least one of an RRC resume message, an RRC setup Setup message, an RRC releasemessage, an RRC release with suspend configure Release with suspend Configure message, an RRC message, and a non access stratum NAS connection establishment interruption indication; or a difference between the timing length of the second timer and the timing length of the third timer.

In another possible implementation, that the second timer is configured to determine whether the RA SDT fails includes: starting the second timer in a case that the terminal transmits the RRC resume request; and determining, in a case that the second timer times out, that the execution of the RA SDT fails, and executing a predetermined timeout behavior.

In another possible implementation, the first information includes M RA procedure entries, and each RA procedure entry includes N RA attempt entries, where M is an integer greater than or equal to 1, and N is an integer greater than or equal to 0.

In another possible implementation, the RA procedure entry includes at least one of the following: a 2-step RACH; or a 4-step RACH.

In another possible implementation, each RA procedure entry includes at least one of an identity ID of a serving cell when the terminal initiates a random access channel RACH, a reason why the terminal initiates the RACH, a first threshold, a second threshold, a third threshold, a first timer, or related information of the RACH; and/or each RA procedure entry includes at least one of a fourth threshold, a fifth threshold, first indication information, or second indication information.

In another possible implementation, the first transmission module 610 is configured to send fourth indication information to the network side device, where the fourth indication information indicates that the terminal stores the first information; and report the first information to the network side device in a case that fifth indication information sent by the network side device is received.

In another possible implementation, the fourth indication information and/or the fifth indication information is transmitted through radio resource control RRC signaling.

In another possible implementation, the first transmission module 610 is further configured to report a first capability to the network side device, where the first capability includes at least one of the following: a capability of the terminal to execute the 4-step RACH; a capability of the terminal to execute the 2-step RACH; or a capability of the terminal to execute the RA SDT or the SDT.

In another possible implementation, the apparatus 600 further includes: a determining module, configured to determine the first information based on target configuration information, where at least one of the following is configured in the target configuration information: whether the terminal enables recording of the first information; information about a region in which the terminal is allowed to record the first information; or a quantity of RA procedure entries allowed to be included in the first information, and a quantity of RA attempt entries included in each RA procedure entry.

The information reporting apparatus 600 in this embodiment of this application may be an apparatus, or an apparatus or an electronic device with an operating system; or may be a component, an integrated circuit, or a chip in a terminal. The apparatus or the electronic device may be a mobile terminal or a non-mobile terminal. For example, the mobile terminal may include, but is not limited to, the types of the terminal 11 listed above, and the non-mobile terminal may be a server, a network attached storage (NAS), a personal computer (PC), a television (TV), an automatic teller machine, a self-service machine, or the like, which are not specifically limited in this embodiment of this application.

The information reporting apparatus 600 provided in this embodiment of this application can implement procedures implemented in the embodiments of the methods of FIG. 2 to FIG. 5, and can achieve the same technical effects. To avoid repetition, details are not described herein again.

Figure 7:
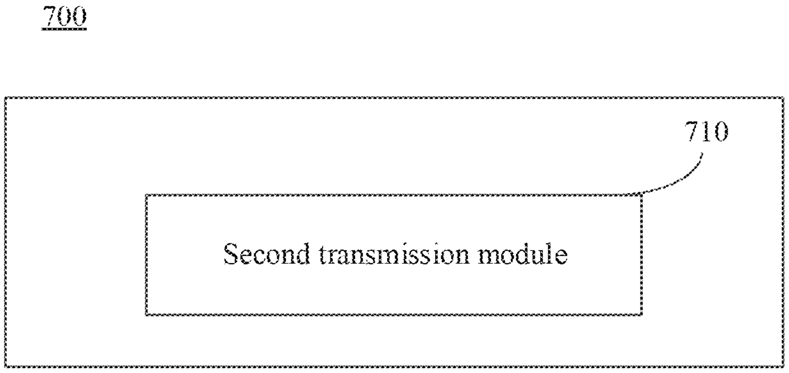
FIG. 7 is a schematic diagram of a structure of an information reporting apparatus according to another exemplary embodiment of this application.

FIG. 7 is a schematic diagram of a structure of an information reporting apparatus 700 according to an exemplary embodiment of this application. The apparatus 700 includes: a second transmission module 710, configured to receive first information reported by a terminal, where the first information is information when the terminal executes a random access small data transmission RA SDT procedure; and send the first information to a target network device, where the target network device is a network device corresponding to a serving cell in which the RA SDT procedure occurs.

In a possible implementation, the apparatus further includes a configuration module, where the configuration module is configured to configure the first information sent to the target network device.

In a possible implementation, the first information includes at least one of the following: an identity ID of a serving cell that the terminal is in when the terminal initiates a random access channel RACH; a reason why the terminal initiates the RACH; related information of the RACH; a first threshold, indicating a data volume threshold when the terminal executes the RA SDT procedure; a second threshold, indicating a reference signal received power RSRP threshold when the terminal executes the RA SDT procedure; a third threshold, indicating an RSRP threshold when the terminal executes the RA SDT procedure based on a 2-step random access procedure 2-step RACH; a fourth threshold, indicating an RSRP threshold when the terminal selects a synchronization signal block SSB based on the 2-step RACH procedure to execute the RA SDT procedure; a fifth threshold, indicating an RSRP threshold when the terminal selects an SSB based on a 4-step RACH procedure to execute the RA SDT procedure; first indication information, indicating whether a guide code selected by the terminal when executing the RA SDT procedure belongs to a group A or a group B; second indication information, indicating that the terminal has received a first command sent by a network side device, where the first command indicates the terminal to convert from an SDT procedure to a non-SDT procedure; or a first timer, indicating a time length for executing the RA SDT procedure by the terminal.

In another possible implementation, the ID of the serving cell includes at least one of the following: an NR cell global identifier NCGI; or an ID of a physical cell.

In another possible implementation, in a case that the ID of the serving cell includes the ID of the physical cell, the first information further includes frequency information corresponding to the physical cell.

In another possible implementation, the related information of the RACH includes at least one of the following: an absolute frequency position of a reference resource block; a frequency domain position and a bandwidth of a bandwidth part BWP associated with a random access resource used by the terminal; a sub-carrier spacing of the BWP associated with the random access resource used by the terminal; a time frequency resource of a message Msg 1; a time frequency resource of a Msg A; or information recorded by the terminal each time the terminal attempts to initiate an RACH procedure.

In another possible implementation, the information recorded by the terminal each time the terminal attempts to initiate the RACH procedure includes at least one of the following: an index of an SSB corresponding to a random access attempt; an index of a physical broadcast channel PBCH corresponding to the random access attempt; an index of a channel state information reference signal CSI-RS corresponding to the random access attempt; measurement information of the CSI-RS corresponding to the random access attempt; measurement information of the SSB corresponding to the random access attempt; or measurement information of the PBCH corresponding to the random access attempt.

In another possible implementation, the first threshold includes at least one of the following: a first value, where the first value is the data volume threshold, and the first value is for determining whether the terminal executes the RA SDT; a second value, where the second value is a sum of data volumes of to-be-transmitted data, and the to-be-transmitted data is data corresponding to a data radio bearer DRB supporting SDT on the terminal; or a difference between the first value and the second value.

In another possible implementation, the second threshold includes at least one of the following: a third value, where the third value is the RSRP threshold, and the third value is for determining whether the terminal executes the RA SDT; a fourth value, where the fourth value is an RSRP value measured by the terminal when executing the RA SDT; or a difference between the third value and the fourth value.

In another possible implementation, the third threshold includes at least one of the following: a fifth value, where the fifth value is the data volume threshold, and the fifth value is for determining whether the terminal executes the RA SDT based on the 2-step RACH; a sixth value, where the sixth value is an RSRP value measured by the terminal when executing the RA SDT; or a difference between the fifth value and the sixth value.

In another possible implementation, the fourth threshold includes at least one of the following: a seventh value, where the seventh value is a threshold for screening SSBs when the terminal executes the RA SDT procedure based on the 2-step RACH; an eighth value, where the eighth value is an RSRP value obtained through measurement of the terminal based on the selected SSB; or a difference between the seventh value and the eighth value.

In another possible implementation, the fifth threshold includes at least one of the following: a ninth value, where the ninth value is a threshold for screening SSBs when the terminal executes the RA SDT procedure based on the 4-step RACH; a tenth value, where the tenth value is an RSRP value obtained through measurement of the terminal based on the selected SSB; or a difference between the ninth value and the tenth value.

In another possible implementation, the second transmission module 710 is further configured to send third indication information to the network side device, where in a case that the first information includes the fourth threshold, the third indication information indicates a relationship between the eighth value and the seventh value to the network side device; and/or in a case that the first information includes the fifth threshold, the third indication information indicates a relationship between the ninth value and the tenth value to the network side device.

In another possible implementation, the first command includes at least one of the following: a medium access control MAC random access response RAR; a fallback RAR; or downlink control information DCI.

In another possible implementation, the length of the first timer is determined based on at least one of the following: a timing length of a second timer, where the second timer is configured to determine whether the RA SDT fails; a timing length of a third timer, where start time of the third timer is determined based on transmission time of a radio resource control RRC resume request, end time of the third timer is determined based on receiving time of second information or cell selection time, and the second information includes at least one of an RRC resume message, an RRC setup Setup message, an RRC releasemessage, an RRC release with suspend configure Release with suspend Configure message, an RRC message, and a non access stratum NAS connection establishment interruption indication; or a difference between the timing length of the second timer and the timing length of the third timer.

In another possible implementation, that the second timer is configured to determine whether the RA SDT fails includes: starting the second timer in a case that the terminal transmits the RRC resume request; and determining, in a case that the second timer times out, that the execution of the RA SDT fails, and executing a predetermined timeout behavior.

In another possible implementation, the first information includes M RA procedure entries, and each RA procedure entry includes N RA attempt entries, where M is an integer greater than or equal to 1, and N is an integer greater than or equal to 0.

In another possible implementation, the RA procedure entry includes at least one of the following: a 2-step RACH; or a 4-step RACH.

In another possible implementation, each RA procedure entry includes at least one of an identity ID of a serving cell when the terminal initiates a random access channel RACH, a reason why the terminal initiates the RACH, a first threshold, a second threshold, a third threshold, a first timer, or related information of the RACH; and/or each RA procedure entry includes at least one of a fourth threshold, a fifth threshold, first indication information, or second indication information.

In another possible implementation, the second transmission module 710 is configured to receive fourth indication information sent by the terminal, where the fourth indication information indicates that the terminal stores the first information; and send fifth indication information to the terminal, where the fifth indication information indicates the terminal to report the first information.

In another possible implementation, the fourth indication information and/or the fifth indication information is transmitted through radio resource control RRC signaling.

In another possible implementation, the second transmission module 710 is configured to receive a first capability reported by the terminal, where the first capability includes at least one of the following: a capability of the terminal to execute the 4-step RACH; a capability of the terminal to execute the 2-step RACH; or a capability of the terminal to execute the RA SDT or the SDT.

The information reporting apparatus 700 in this embodiment of this application may be an apparatus, or an apparatus or a network side device with an operating system; or may be a component, an integrated circuit, or a chip in a network side device, which is not specifically limited in this embodiment of this application.

The information reporting apparatus 700 provided in this embodiment of this application can implement procedures implemented in the embodiment of the method of FIG. 4, and can achieve the same technical effects. To avoid repetition, details are not described herein again.

An embodiment of this application further provides a terminal, including: a processor and a communication interface, where the communication interface is coupled to the processor, and the processor is configured to run a program or instructions, to implement steps of the methods provided in the embodiments of the methods 200 to 400. The terminal embodiment corresponds to the foregoing terminal side method embodiment, and each implementation procedure and implementation of the foregoing method embodiment can be applied to the terminal embodiment, and can achieve the same technical effects. FIG. 7 is a schematic diagram of a hardware structure of a terminal that implements the embodiments of this application.

A terminal 800 includes, but is not limited to, at least part of components such as a radio frequency unit 801, a network module 802, an audio output unit 803, an input unit 804, a sensor 805, a display unit 806, a user input unit 807, an interface unit 808, a memory 809, and a processor 810.

Figure 8:
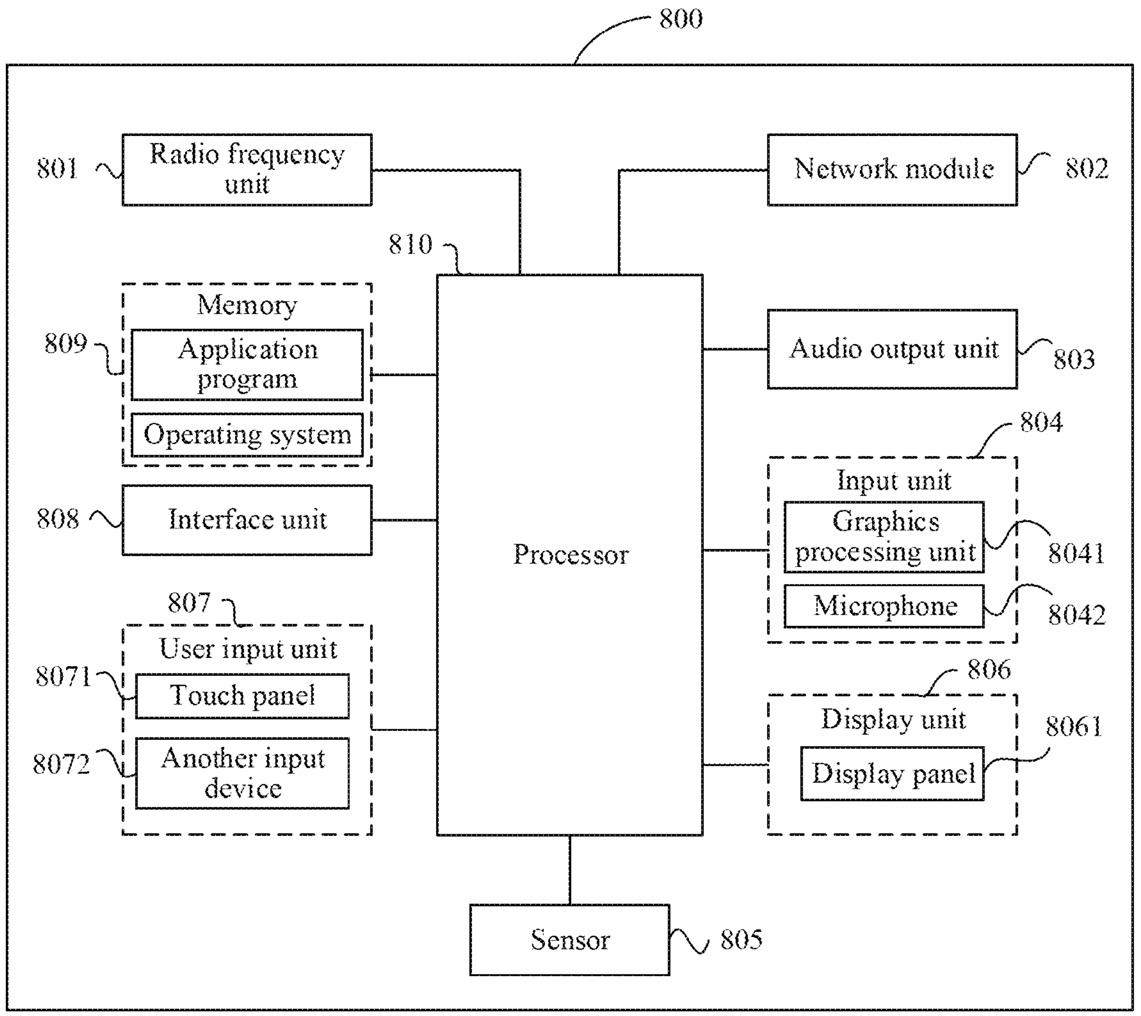
FIG. 8 is a schematic diagram of a structure of a terminal according to an exemplary embodiment of this application.

It may be understood by those skilled in the art that the terminal 800 may further include a power supply (for example, a battery) for supplying power to various components, and the power supply may be logically connected to the processor 810 through a power management system, to implement functions such as managing charging or discharging, and power consumption management through the power management system. A terminal structure shown in FIG. 8 does not constitute a limitation to the terminal, and the terminal may include more or fewer components than those shown in the figure, or some components may be combined, or a different component deployment may be used. Details are not described herein again.

It should be understood that, in this embodiment of this application, the input unit 804 may include a graphics processing unit (GPU) 8041 and a microphone 8042. The graphics processing unit 8041 processes image data of a still picture or a video obtained by an image capture apparatus (such as a camera) in a video capture mode or an image capture mode. The display unit 806 may include a display panel 8061, for example, the display panel 8061 may be configured in a form such as a liquid crystal display or an organic light-emitting diode. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include, but is not limited to, a physical keyboard, a functional key (for example, a volume control key or a switch key), a track ball, a mouse, and a joystick, and the details will not be described herein again.

In this embodiment of this application, the radio frequency unit 801 receives downlink data from a network side device and sends downlink data to the processor 810 for processing. In addition, the radio frequency unit sends uplink data to the network side device. Generally, the radio frequency unit 801 includes, but is not limited to, an antenna, at least one amplifier, a transceiver, a coupler, a low noise amplifier, a duplexer, or the like.

The memory 809 may be configured to store a software program or instructions, and various data. The memory 809 may mainly include a storage program or instruction area and a storage data area, where the storage program or instruction area may store an operating system, an application program or instructions required for at least one function (for example, a sound playing function, an image playing function, or the like). The memory 809 may include a high speed random access memory, and may also include a non-volatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. For example, the non-volatile memory may be at least one magnetic disk storage device, a flash storage device, or other volatile solid-state storage devices.

The processor 810 may include one or more processing units. Optionally, the processor 810 may integrate an application processor and a modem. The application processor mainly processes an operating system, a user interface, an application program or instructions, and the like. The modem mainly processes wireless communication, such as a baseband processor. It may be understood that the foregoing modem may not be integrated into the processor 810.

The radio frequency unit 801 is configured to report first information to a network side device, where the first information is information when a terminal executes an RA SDT procedure.

In a possible implementation, the first information includes at least one of the following: an ID of a serving cell that the terminal is in when the terminal initiates an RACH; a reason why the terminal initiates the RACH; related information of the RACH; a first threshold, indicating a data volume threshold when the terminal executes the RA SDT procedure; a second threshold, indicating a reference signal received power RSRP threshold when the terminal executes the RA SDT procedure; a third threshold, indicating an RSRP threshold when the terminal executes the RA SDT procedure based on a 2-step RACH; a fourth threshold, indicating an RSRP threshold when the terminal selects an SSB based on the 2-step RACH procedure to execute the RA SDT procedure; a fifth threshold, indicating an RSRP threshold when the terminal selects an SSB based on a 4-step RACH procedure to execute the RA SDT procedure; first indication information, indicating whether a guide code selected by the terminal when executing the RA SDT procedure belongs to a group A or a group B; second indication information, indicating that the terminal has received a first command sent by the network side device, where the first command indicates the terminal to convert from an SDT procedure to a non-SDT procedure; or a first timer, indicating a time length for executing the RA SDT procedure by the terminal.

In another possible implementation, the ID of the serving cell includes at least one of the following: an NR cell global identifier NCGI; or an ID of a physical cell.

In another possible implementation, in a case that the ID of the serving cell includes the ID of the physical cell, the first information further includes frequency information corresponding to the physical cell.

In another possible implementation, the related information of the RACH includes at least one of the following: an absolute frequency position of a reference resource block; a frequency domain position and a bandwidth of a bandwidth part BWP associated with a random access resource used by the terminal; a sub-carrier spacing of the BWP associated with the random access resource used by the terminal; a time frequency resource of a message Msg 1; a time frequency resource of a Msg A; or information recorded by the terminal each time the terminal attempts to initiate an RACH procedure.

In another possible implementation, the information recorded by the terminal each time the terminal attempts to initiate the RACH procedure includes at least one of the following: an index of an SSB corresponding to a random access attempt; an index of a physical broadcast channel PBCH corresponding to the random access attempt; an index of a channel state information reference signal CSI-RS corresponding to the random access attempt; measurement information of the CSI-RS corresponding to the random access attempt; measurement information of the SSB corresponding to the random access attempt; or measurement information of the PBCH corresponding to the random access attempt.

In another possible implementation, the first threshold includes at least one of the following: a first value, where the first value is the data volume threshold, and the first value is for determining whether the terminal executes the RA SDT; a second value, where the second value is a sum of data volumes of to-be-transmitted data, and the to-be-transmitted data is data corresponding to a data radio bearer DRB supporting SDT on the terminal; or a difference between the first value and the second value.

In another possible implementation, the second threshold includes at least one of the following: a third value, where the third value is the RSRP threshold, and the third value is for determining whether the terminal executes the RA SDT; a fourth value, where the fourth value is an RSRP value measured by the terminal when executing the RA SDT; or a difference between the third value and the fourth value.

In another possible implementation, the third threshold includes at least one of the following: a fifth value, where the fifth value is the data volume threshold, and the fifth value is for determining whether the terminal executes the RA SDT based on the 2-step RACH; a sixth value, where the sixth value is an RSRP value measured by the terminal when executing the RA SDT; or a difference between the fifth value and the sixth value.

In another possible implementation, the fourth threshold includes at least one of the following: a seventh value, where the seventh value is a threshold for screening SSBs when the terminal executes the RA SDT procedure based on the 2-step RACH; an eighth value, where the eighth value is an RSRP value obtained through measurement of the terminal based on the selected SSB; or a difference between the seventh value and the eighth value.

In another possible implementation, the fifth threshold includes at least one of the following: a ninth value, where the ninth value is a threshold for screening SSBs when the terminal executes the RA SDT procedure based on the 4-step RACH; a tenth value, where the tenth value is an RSRP value obtained through measurement of the terminal based on the selected SSB; or a difference between the ninth value and the tenth value.

In another possible implementation, the radio frequency unit 801 is further configured to send third indication information to the network side device, where in a case that the first information includes the fourth threshold, the third indication information indicates a relationship between the eighth value and the seventh value to the network side device; and/or in a case that the first information includes the fifth threshold, the third indication information indicates a relationship between the ninth value and the tenth value to the network side device.

In another possible implementation, the first command includes at least one of the following: a medium access control MAC random access response RAR; a fallback RAR; or downlink control information DCI.

In another possible implementation, the length of the first timer is determined based on at least one of the following: a timing length of a second timer, where the second timer is configured to determine whether the RA SDT fails; a timing length of a third timer, where start time of the third timer is determined based on transmission time of a radio resource control RRC resume request, end time of the third timer is determined based on receiving time of second information or cell selection time, and the second information includes at least one of an RRC resume message, an RRC setup Setup message, an RRC releasemessage, an RRC release with suspend configure Release with suspend Configure message, an RRC message, and a non access stratum NAS connection establishment interruption indication; or a difference between the timing length of the second timer and the timing length of the third timer.

In another possible implementation, that the second timer is configured to determine whether the RA SDT fails includes: starting the second timer in a case that the terminal transmits the RRC resume request; and determining, in a case that the second timer times out, that the execution of the RA SDT fails, and executing a predetermined timeout behavior.

In another possible implementation, the first information includes M RA procedure entries, and each RA procedure entry includes N RA attempt entries, where M is an integer greater than or equal to 1, and N is an integer greater than or equal to 0.

In another possible implementation, the RA procedure entry includes at least one of the following: a 2-step RACH; or a 4-step RACH.

In another possible implementation, each RA procedure entry includes at least one of an identity ID of a serving cell when the terminal initiates a random access channel RACH, a reason why the terminal initiates the RACH, a first threshold, a second threshold, a third threshold, a first timer, and related information of the RACH; and/or each RA procedure entry includes at least one of a fourth threshold, a fifth threshold, first indication information, or second indication information.

In another possible implementation, the radio frequency unit 801 is configured to send fourth indication information to the network side device, where the fourth indication information indicates that the terminal stores the first information; and report the first information to the network side device in a case that fifth indication information sent by the network side device is received.

In another possible implementation, the fourth indication information and/or the fifth indication information is transmitted through radio resource control RRC signaling.

In another possible implementation, the radio frequency unit 801 is further configured to report a first capability to the network side device, where the first capability includes at least one of the following: a capability of the terminal to execute the 4-step RACH; a capability of the terminal to execute the 2-step RACH; or a capability of the terminal to execute the RA SDT or the SDT.

In another possible implementation, the processor 810 is configured to determine the first information based on target configuration information, where at least one of the following is configured in the target configuration information: whether the terminal enables recording of the first information; information about a region in which the terminal is allowed to record the first information; or a quantity of RA procedure entries allowed to be included in the first information, and a quantity of RA attempt entries included in each RA procedure entry.

In this embodiment, a terminal reports first information to a network side device, so that the network side device can be assisted to adaptively adjust and modify configured SDT parameters, to ensure successful execution of an RA SDT procedure and improve stability and reliability of wireless communication.

An embodiment of this application further provides a network side device including: a processor and a communication interface, where the communication interface is coupled to the processor, and the processor is configured to run a program or instructions, to implement steps of the method provided in the embodiment of the method 500. The network side device embodiment corresponds to the foregoing network side device method embodiment, and each implementation procedure and implementation of the foregoing method embodiment can be applied to the network side device embodiment, and can achieve the same technical effects.

Figure 9:
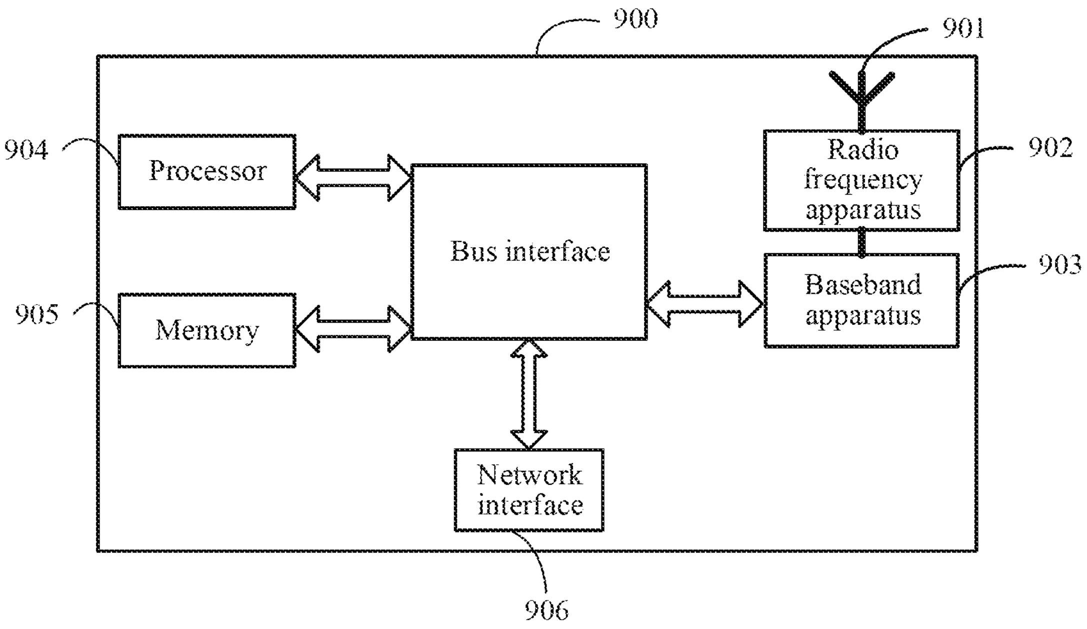
FIG. 9 is a schematic diagram of a structure of a network side device according to an exemplary embodiment of this application.

An embodiment of this application further provides a network side device. As shown in FIG. 9, a network device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes information that is to be sent, and sends the information to the radio frequency apparatus 902. The radio frequency apparatus 902 processes the received information and sends the information by using the antenna 901.

A frequency band processing apparatus may be located in the baseband apparatus 903, so that the method executed by the network side device in the foregoing embodiments can be implemented in the baseband apparatus 903. The baseband apparatus 903 includes a processor 904 and a memory 905.

The baseband apparatus 903 may include, for example, at least one baseband plate. A plurality of chips are disposed on the baseband plate. As shown in FIG. 9, one of the plurality of chips is, for example, the processor 904, and is connected to the memory 905, to invoke a program in the memory 905 to perform operations of the network device in the above method embodiments.

The baseband apparatus 903 may further include a network interface 906, configured to exchange information with the radio frequency apparatus 902. The interface is, for example, a common public radio interface (CPRI for short).

In some embodiments, the network side device in this embodiment of the present invention further includes: an instruction or program stored in the memory 905 and executable on the processor 904, and the processor 904 invokes the instruction or program stored on the memory 905 to perform the method executed by various modules shown in FIG. 7, and can also achieve the same technical effects. To avoid repetition, details are not described herein again.

An embodiment of this application further provides a non-transitory readable storage medium, storing a program or instructions. The program or the instructions, when executed by a processor, implements all procedures of the embodiments of the information reporting method, and can achieve the same technical effects. To avoid repetition, details are not described herein again.

The processor is the processor in the terminal in the above embodiments. The non-transitory readable storage medium includes a computer-readable storage medium, for example, a computer read-only memory (ROM).

An embodiment of this application further provides a chip. The chip includes: a processor and a communication interface, where the communication interface is coupled to the processor, and the processor is configured to run a program or instructions of a network side device, to implement all procedures of the embodiments of the information reporting method, and can achieve the same technical effects. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program product. The computer program product includes a processor, a memory, and a program or instructions stored on the memory and executable on the processor, where the program or the instructions, when executed by the processor, implement all procedures of the embodiments of the information reporting method, and can achieve the same technical effects. To avoid repetition, details are not described herein again.

It should be noted that, the term "include", "comprise" or any other variation thereof in this specification is intended to cover a non-exclusive inclusion, which specifies the presence of stated procedures, methods, objects, or apparatuses, but does not preclude the presence or addition of one or more other procedures, methods, objects, or apparatuses. Without more limitations, elements defined by the sentence "including one . . . " does not exclude that there are still other same elements in the procedures, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the existing technologies may be implemented in the form of a software product. The computer software product is stored in a non-transitory storage medium (for example, a read-only memory (ROM)/random access memory (RAM), a magnetic disk or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing implementations. The foregoing implementations are illustrative instead of limitative. Enlightened by this application, a person of ordinary skill in the art can make many forms without departing from the idea of this application and the scope of protection of the claims. All of the forms fall within the protection of this application.

What is claimed is:

1. An information reporting method, comprising:

reporting, by a terminal, first information to a network side device;

wherein;

the first information is information when the terminal executes a random access small data transmission (RA SDT) procedure; and the first information comprises at least one of the following:

a first threshold indicating a data volume threshold when the terminal executes the RA SDT procedure, the first threshold comprising a second value, the second value being a sum of data volumes of to-be-transmitted data, and the to-be-transmitted data being data corresponding to a data radio bearer (DRB) configured with SDT on the terminal; or a second threshold indicating a reference signal received power (RSRP) threshold when the terminal executes the RA SDT procedure, the second threshold comprising a fourth value, and the fourth value being an RSRP value measured by the terminal when executing the RA SDT.

2. The method according to claim 1, wherein the first information further comprises at least one of the following:

an identity (ID) of a serving cell that the terminal is in when the terminal initiates a random access channel (RACH);

a reason why the terminal initiates the RACH;

related information of the RACH;

a third threshold, indicating an RSRP threshold when the terminal executes the RA SDT procedure based on a 2-step random access procedure (2-step RACH);

a fourth threshold, indicating an RSRP threshold when the terminal selects a synchronization signal block (SSB) based on the 2-step RACH procedure to execute the RA SDT procedure;

a fifth threshold, indicating an RSRP threshold when the terminal selects an SSB based on a 4-step RACH procedure to execute the RA SDT procedure;

first indication information, indicating whether a guide code selected by the terminal when executing the RA SDT procedure belongs to a group A or a group B;

second indication information, indicating that the terminal has received a first command sent by the network side device, wherein the first command indicates the terminal to convert from an SDT procedure to a non-SDT procedure; or a first timer, indicating a time length for executing the RA SDT procedure by the terminal.

3. The method according to claim 2, wherein the ID of the serving cell comprises at least one of the following:

an NR cell global identifier (NCGI); or an ID of a physical cell;

wherein in a case that the ID of the serving cell comprises the ID of the physical cell, the first information further comprises frequency information corresponding to the physical cell.

4. The method according to claim 2, wherein the related information of the RACH comprises at least one of the following:

an absolute frequency position of a reference resource block;

a frequency domain position and a bandwidth of a bandwidth part (BWP) associated with a random access resource used by the terminal;

a sub-carrier spacing of the BWP associated with the random access resource used by the terminal;

a time frequency resource of a Msg 1;

a time frequency resource of a Msg A; or information recorded by the terminal each time the terminal attempts to initiate an RACH procedure;

wherein the information recorded by the terminal each time the terminal attempts to initiate the RACH procedure comprises at least one of the following:

an index of an SSB corresponding to a random access attempt;

an index of a physical broadcast channel (PBCH) corresponding to the random access attempt;

an index of a channel state information reference signal (CSI-RS) corresponding to the random access attempt;

measurement information of the CSI-RS corresponding to the random access attempt;

measurement information of the SSB corresponding to the random access attempt; or measurement information of the PBCH corresponding to the random access attempt.

5. The method according to claim 1, wherein the first threshold further comprises at least one of the following:

a first value, wherein the first value is the data volume threshold, and the first value is for determining whether the terminal executes the RA SDT;

or a difference between the first value and the second value;

or the second threshold further comprises at least one of the following:

a third value, wherein the third value is the RSRP threshold, and the third value is for determining whether the terminal executes the RA SDT;

or a difference between the third value and the fourth value;

or the third threshold comprises at least one of the following:

a fifth value, wherein the fifth value is the data volume threshold, and the fifth value is for determining whether the terminal executes the RA SDT based on the 2-step RACH;

a sixth value, wherein the sixth value is an RSRP value measured by the terminal when executing the RA SDT; or a difference between the fifth value and the sixth value;

or the fourth threshold comprises at least one of the following:

a seventh value, wherein the seventh value is a threshold for screening SSBs when the terminal executes the RA SDT procedure based on the 2-step RACH;

an eighth value, wherein the eighth value is an RSRP value obtained through measurement of the terminal based on a selected SSB; or a difference between the seventh value and the eighth value;

or the fifth threshold comprises at least one of the following:

a ninth value, wherein the ninth value is a threshold for screening SSBs when the terminal executes the RA SDT procedure based on the 4-step RACH;

a tenth value, wherein the tenth value is an RSRP value obtained through measurement of the terminal based on a selected SSB; or a difference between the ninth value and the tenth value; or the first command comprises at least one of the following:

a medium access control (MAC) random access response (RAR);

a fallback RAR; or downlink control information (DCI).

6. The method according to claim 5, wherein the method further comprises:

sending, by the terminal, third indication information to the network side device, wherein in a case that the first information comprises the fourth threshold, the third indication information indicates a relationship between the eighth value and the seventh value to the network side device; or in a case that the first information comprises the fifth threshold, the third indication information indicates a relationship between the ninth value and the tenth value to the network side device.

7. The method according to claim 2, wherein a length of the first timer is determined based on at least one of the following:

a timing length of a second timer, wherein the second timer is configured to determine whether the RA SDT fails;

a timing length of a third timer, wherein start time of the third timer is determined based on transmission time of a radio resource control (RRC) resume request, end time of the third timer is determined based on receiving time of second information or cell reselection time, and the second information comprises at least one of an RRC resume message, an RRC setup Setup message, an RRC releasemessage, an RRC release with suspend configure Release with suspend Configure message, an RRC message, or a non access stratum (NAS) connection establishment interruption indication; and a difference between the timing length of the second timer and the timing length of the third timer;

wherein that the second timer is configured to determine whether the RA SDT fails comprises:

starting the second timer in a case that the terminal transmits the RRC resume request; and determining, in a case that the second timer times out, that the execution of the RA SDT fails, and executing a predetermined timeout behavior.

8. The method according to claim 1, wherein the first information comprises M RA procedure entries, and each RA procedure entry comprises N RA attempt entries, wherein M is an integer greater than or equal to 1, and N is an integer greater than or equal to 0;

wherein each RA procedure entry comprises at least one of an identity (ID) of a serving cell when the terminal initiates a random access channel (RACH), a reason why the terminal initiates the RACH, a first threshold, a second threshold, a third threshold, a first timer, or related information of the RACH; or each RA procedure entry comprises at least one of a fourth threshold, a fifth threshold, first indication information, or second indication information.

9. The method according to claim 1, wherein before the reporting, by a terminal, first information to a network side device, the method further comprises:

sending, by the terminal, fourth indication information to the network side device, wherein the fourth indication information indicates that the terminal stores the first information; and the reporting, by a terminal, first information to a network side device comprises:

reporting, by the terminal, the first information to the network side device in a case that fifth indication information sent by the network side device is received;

wherein at least one of the fourth indication information or the fifth indication information is transmitted through radio resource control (RRC) signaling.

10. The method according to claim 1, wherein before the reporting, by a terminal, first information to a network side device, the method further comprises:

reporting, by the terminal, a first capability to the network side device, wherein the first capability comprises at least one of the following:

a capability of the terminal to execute the 4-step RACH;

a capability of the terminal to execute the 2-step RACH; or a capability of the terminal to execute the RA SDT or the SDT;

or before the reporting, by a terminal, first information to a network side device, the method further comprises:

determining, by the terminal, the first information based on target configuration information, wherein at least one of the following is configured in the target configuration information:

whether the terminal enables recording of the first information;

information about a region in which the terminal is allowed to record the first information; or a quantity of RA procedure entries allowed to be comprised in the first information, and a quantity of RA attempt entries comprised in each RA procedure entry.

11. An information reporting method, comprising:

receiving, by a network side device, first information, wherein the first information is information when a terminal executes a random access small data transmission (RA SDT) procedure; and sending, by the network side device, the first information to a target network device, wherein the target network device is a network device corresponding to a serving cell in which the RA SDT procedure occurs;

wherein the first information comprises at least one of the following:

a first threshold, indicating a data volume threshold when the terminal executes the RA SDT procedure; wherein the first threshold comprises a second value, wherein the second value is a sum of data volumes of to-be-transmitted data, and the to-be-transmitted data is data corresponding to a data radio bearer (DRB) configured with SDT on the terminal; or a second threshold, indicating a reference signal received power (RSRP) threshold when the terminal executes the RA SDT procedure; wherein the second threshold comprises a fourth value, wherein the fourth value is an RSRP value measured by the terminal when executing the RA SDT.

12. The method according to claim 11, wherein the first information further comprises at least one of the following:

an identity (ID) of a serving cell that the terminal is in when the terminal initiates a random access channel (RACH);

a reason why the terminal initiates the RACH;

related information of the RACH;

a third threshold, indicating an RSRP threshold when the terminal executes the RA SDT procedure based on a 2-step random access procedure (2-step RACH);

a fourth threshold, indicating an RSRP threshold when the terminal selects a synchronization signal block (SSB) based on the 2-step RACH procedure to execute the RA SDT procedure;

a fifth threshold, indicating an RSRP threshold when the terminal selects an SSB based on a 4-step RACH procedure to execute the RA SDT procedure;

first indication information, indicating whether a guide code selected by the terminal when executing the RA SDT procedure belongs to a group A or a group B;

second indication information, indicating that the terminal has received a first command sent by the network side device, wherein the first command indicates the terminal to convert from an SDT procedure to a non-SDT procedure; or a first timer, indicating a time length for executing the RA SDT procedure by the terminal.

13. The method according to claim 12, wherein the ID of the serving cell comprises at least one of the following:

an NR cell global identifier (NCGI); or an ID of a physical cell;

wherein in a case that the ID of the serving cell comprises the ID of the physical cell, the first information further comprises frequency information corresponding to the physical cell.

14. The method according to claim 12, wherein the related information of the RACH comprises at least one of the following:

an absolute frequency position of a reference resource block;

a frequency domain position and a bandwidth of a bandwidth part (BWP) associated with a random access resource used by the terminal;

a sub-carrier spacing of the BWP associated with the random access resource used by the terminal;

a time frequency resource of a Msg 1;

a time frequency resource of a Msg A; or information recorded by the terminal each time the terminal attempts to initiate an RACH procedure;

wherein the information recorded by the terminal each time the terminal attempts to initiate the RACH procedure comprises at least one of the following:

an index of an SSB corresponding to a random access attempt;

an index of a physical broadcast channel (PBCH) corresponding to the random access attempt;

an index of a channel state information reference signal (CSI-RS) corresponding to the random access attempt;

measurement information of the CSI-RS corresponding to the random access attempt;

measurement information of the SSB corresponding to the random access attempt; or measurement information of the PBCH corresponding to the random access attempt.

15. The method according to claim 11, wherein the first threshold further comprises at least one of the following:

a first value, wherein the first value is the data volume threshold, and the first value is for determining whether the terminal executes the RA SDT;

or a difference between the first value and the second value;

or the second threshold further comprises at least one of the following:

a third value, wherein the third value is the RSRP threshold, and the third value is for determining whether the terminal executes the RA SDT;

or a difference between the third value and the fourth value;

or the third threshold comprises at least one of the following:

a fifth value, wherein the fifth value is the data volume threshold, and the fifth value is for determining whether the terminal executes the RA SDT based on the 2-step RACH;

a sixth value, wherein the sixth value is an RSRP value measured by the terminal when executing the RA SDT;

or a difference between the fifth value and the sixth value;

or the fourth threshold comprises at least one of the following:

a seventh value, wherein the seventh value is a threshold for screening SSBs when the terminal executes the RA SDT procedure based on the 2-step RACH;

an eighth value, wherein the eighth value is an RSRP value obtained through measurement of the terminal based on a selected SSB; or a difference between the seventh value and the eighth value;

or the fifth threshold comprises at least one of the following:

a ninth value, wherein the ninth value is a threshold for screening SSBs when the terminal executes the RA SDT procedure based on the 4-step RACH;

a tenth value, wherein the tenth value is an RSRP value obtained through measurement of the terminal based on a selected SSB; or a difference between the ninth value and the tenth value;

or the first command comprises at least one of the following:

a medium access control (MAC) random access response (RAR);

a fallback RAR; or downlink control information (DCI).

16. The method according to claim 15, wherein the method further comprises:

sending, by the terminal, third indication information to the network side device, wherein in a case that the first information comprises the fourth threshold, the third indication information indicates a relationship between the eighth value and the seventh value to the network side device; or in a case that the first information comprises the fifth threshold, the third indication information indicates a relationship between the ninth value and the tenth value to the network side device.

17. The method according to claim 12, wherein a length of the first timer is determined based on at least one of the following:

a timing length of a second timer, wherein the second timer is configured to determine whether the RA SDT fails;

a timing length of a third timer, wherein start time of the third timer is determined based on transmission time of a radio resource control (RRC) resume request, end time of the third timer is determined based on receiving time of second information or cell reselection time, and the second information comprises at least one of an RRC resume message, an RRC setup Setup message, an RRC releasemessage, an RRC release with suspend configure Release with suspend Configure message, an RRC message, or a non access stratum (NAS) connection establishment interruption indication; and a difference between the timing length of the second timer and the timing length of the third timer;

that the second timer is configured to determine whether the RA SDT fails comprises:

starting the second timer in a case that the terminal transmits the RRC resume request; and determining, in a case that the second timer times out, that the execution of the RA SDT fails, and executing a predetermined timeout behavior.

18. The method according to claim 11, wherein the first information comprises M RA procedure entries, and each RA procedure entry comprises N RA attempt entries, wherein M is an integer greater than or equal to 1, and N is an integer greater than or equal to 0;

wherein each RA procedure entry comprises at least one of an identity (ID) of a serving cell when the terminal initiates a random access channel (RACH), a reason why the terminal initiates the RACH, a first threshold, a second threshold, a third threshold, a first timer, or related information of the RACH;

or each RA procedure entry comprises at least one of a fourth threshold, a fifth threshold, first indication information, or second indication information.

19. The method according to claim 11, wherein the receiving, by a network side device, first information comprises:

receiving, by the network side device, fourth indication information sent by the terminal, wherein the fourth indication information indicates that the terminal stores the first information; and sending, by the network side device, fifth indication information to the terminal, wherein the fifth indication information indicates the terminal to report the first information;

wherein at least one of the fourth indication information or the fifth indication information is transmitted through radio resource control (RRC) signaling.

20. The method according to claim 11, wherein before the receiving, by a network side device, first information, the method further comprises:

receiving, by the network side device, a first capability reported by the terminal, wherein the first capability comprises at least one of the following:

a capability of the terminal to execute the 4-step RACH;

a capability of the terminal to execute the 2-step RACH; or a capability of the terminal to execute the RA SDT or the SDT.

* * * * *